(12) United States Patent
Schnoor et al.

(10) Patent No.: US 11,604,741 B2
(45) Date of Patent: Mar. 14, 2023

(54) METHOD FOR DYNAMICALLY PROVISIONING VIRTUALIZED FUNCTIONS IN A USB DEVICE BY MEANS OF A VIRTUAL USB HUB

(71) Applicant: Intel Corporation, Santa Clara, CA (US)

(72) Inventors: Matthew A. Schnoor, Hillsboro, OR (US); Bradley H. Smith, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 879 days.

(21) Appl. No.: 16/277,850

(22) Filed: Feb. 15, 2019

(65) Prior Publication Data
US 2019/0235890 A1   Aug. 1, 2019

(51) Int. Cl.
*G06F 13/10* (2006.01)
*G06F 9/455* (2018.01)
(Continued)

(52) U.S. Cl.
CPC .......... *G06F 13/105* (2013.01); *G06F 9/4411* (2013.01); *G06F 9/455* (2013.01);
(Continued)

(58) Field of Classification Search
CPC ...... G06F 9/4413; G06F 9/455; G06F 9/5077; G06F 13/20; G06F 13/40; G06F 13/4004;
(Continued)

(56) References Cited

U.S. PATENT DOCUMENTS 6,584,519 B1 * 6/2003 Russell ............... G06F 13/4045
710/305
7,752,029 B2   7/2010 Tamayo et al.
(Continued)

FOREIGN PATENT DOCUMENTS

WO   2004/040546 A1   5/2004
WO   2004040546 A1    5/2004

OTHER PUBLICATIONS

EP 20 15 1876 European Search Report, 7 pages.
(Continued)

*Primary Examiner* — Thomas J. Cleary
(74) *Attorney, Agent, or Firm* — Compass IP Law PC

(57) ABSTRACT

Methods and apparatus for dynamically provisioning virtualized functions in a Universal Serial Bus (USB) device by means of a virtual USB hub. The virtual USB hub includes a USB upstream port configured to be connected to a host system and at least one external bus or external interface to which devices including non-USB devices or computing devices in which non-USB devices are embedded may be connected. The virtual USB hub is configured to detect the non-USB devices and/or functions performed by the non-USB devices and generate corresponding virtual USB configuration information under which virtual USB devices and/or functions are connected to downstream virtual ports in the virtual USB hub. The virtual USB configuration is presented to the host computer to enable the host computer to communicate with the non-USB devices and/or their functions. Also disclosed is an I3C probe having an embedded virtual USB hub and configured to communicate with I3C devices and/or functions embedded within a target system under debug. USB devices may also be virtualized in a similar manner.

24 Claims, 14 Drawing Sheets

(51) Int. Cl.
*G06F 13/40* (2006.01)
*G06F 13/42* (2006.01)
*G06F 13/20* (2006.01)
*G06F 9/4401* (2018.01)
*G06F 9/50* (2006.01)

(52) U.S. Cl.
CPC ............ *G06F 9/5077* (2013.01); *G06F 13/20* (2013.01); *G06F 13/4027* (2013.01); *G06F 13/4068* (2013.01); *G06F 13/4282* (2013.01); *G06F 2213/0042* (2013.01)

(58) Field of Classification Search
CPC ............ G06F 13/4022; G06F 13/4027; G06F 13/4045; G06F 13/4068; G06F 13/4282; G06F 15/177; G06F 13/105; G06F 9/4411; G06F 13/102; G06F 13/4063; G06F 2213/0042
See application file for complete search history.

(56) References Cited

U.S. PATENT DOCUMENTS

| | | | |
|---|---|---|---|
| 10,248,609 B2* | 4/2019 | McKibben | G07G 1/14 |
| 2002/0011516 A1* | 1/2002 | Lee | G06F 13/4022 |
| | | | 235/380 |
| 2012/0054378 A1 | 3/2012 | Malamant et al. | |
| 2017/0124016 A1* | 5/2017 | Gerber | G06F 13/4282 |
| 2018/0143932 A1 | 5/2018 | Lawless et al. | |
| 2019/0138281 A1* | 5/2019 | O'Neil | H05B 45/30 |

OTHER PUBLICATIONS

Introduction to the MIPI I3C Standardized Sensor Interface, mipi alliance, Aug. 2016, 11 pages.

European First Office Action for Patent Application No. 20151876.8,, dated Nov. 29, 2021, 4 pages. (EP Exam Report Article 94(3) EPC).

* cited by examiner

METHOD FOR DYNAMICALLY PROVISIONING VIRTUALIZED FUNCTIONS IN A USB DEVICE BY MEANS OF A VIRTUAL USB HUB

BACKGROUND INFORMATION

A USB device which exposes an internal resource or an external bus or interface needs to determine how to present these resources or connected devices at a device level, to the software stack of a host device. In many cases, it is desirable to virtualize these connected devices or resources for use by multiple software applications or system domains. In existing USB device implementations, resource virtualization has not been adequately solved by fixed-configuration devices or other configurable devices requiring full, a priori knowledge of the device's configuration, usually requiring a pre-written data file containing configuration collateral. This lack of virtualization requires a non-standard approach to exposing a device's resources, which reduces compatibility with existing standard USB drivers, as well as software written to expect standard device classes exposed by those drivers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6a is a block diagram illustrating a view of the virtual USB hub corresponding to the state of the debug system illustrated in FIG. 4a;

DETAILED DESCRIPTION

Figure 1:
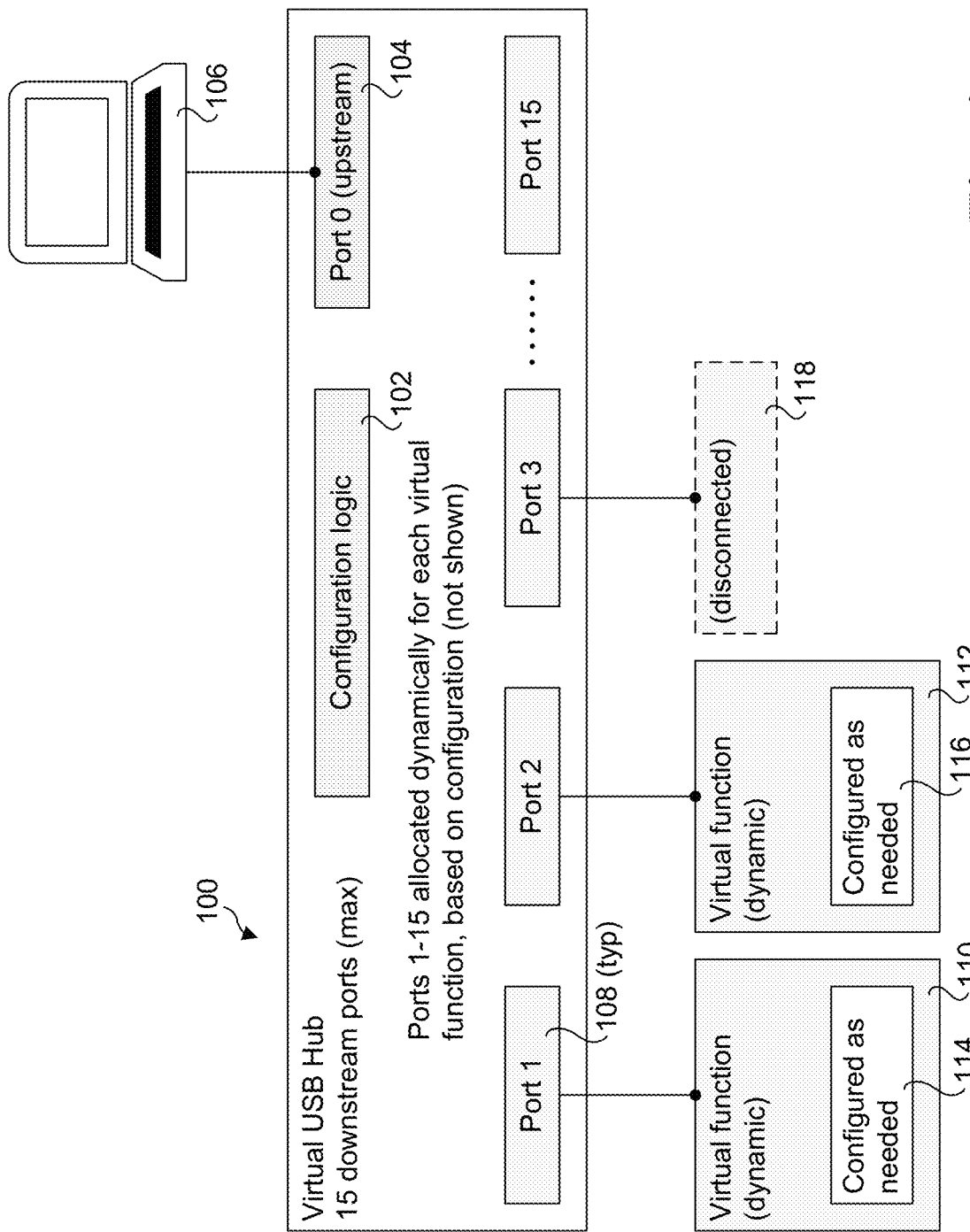
FIG. 1 is a block diagram illustrating a logical (high-level) implementation of an instantiation of a virtual USB hub, according to one embodiment.

Embodiments of methods and apparatus for dynamically provisioning virtualized functions in a USB device by means of a virtual USB hub are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described herein, a USB device which implements a flexible and configurable virtual USB hub and associated virtual USB devices is disclosed. In one aspect, the virtual USB hub may be configured to instantiate substantially any USB device, including standard device classes. The virtual USB hub contains virtualization control logic to manage virtual USB devices, which can be manually or automatically provisioned based on the state of the device or by commands from the host computer's software stack. As each virtual USB device is provisioned, it appears (from the perspective of the host computer) as if it were connected to a free port on the virtual USB hub (akin to connecting a physical USB device to a free port on a physical USB hub), which utilizes existing software drivers to handle virtual device connection and discovery, without disrupting communications to the virtual USB hub or its other virtual USB devices.

The following embodiments describe and illustrate an architecture for a USB device which emulates a USB hub and can instantiate multiple virtual USB devices. Using the USB hub paradigm allows the modeling of a dynamic system whose members may appear or disappear at any time—similar to how a physical USB hub may have USB devices attached to and removed from its downstream ports. The embodiments also leverage existing USB drivers which support the dynamic plug/un-plug events that are common across USB hubs, and enables the connection of USB devices of many different device classes or vendor-specific implementations. Some embodiments also allow for several paths of control over the virtual USB hub and its virtualized device interfaces, which may be host-driven or device-driven.

The architectural concept of a dynamic virtual USB hub lends itself to many USB device implementations, for a wide variety of use cases. A device implementing a virtual USB hub need not resemble a typical USB hub, and may in fact resemble a more typical USB device which has extended virtualization capabilities which are tailored toward its specific use cases.

For virtual USB hubs which follow a host-driven control model, this is embodied as a "control function" which accepts commands from the host computer, to instantiate a new virtualized USB function, or to de-provision and logically disconnect an active virtualized USB function. The host computer initiates these operations when it wants a function to disconnect, or to be re-instantiated with a different configuration. The behavior and configuration of these virtualized USB functions can be configured by software, which causes them to act as if they were physical devices connected to a traditional USB hub, with the usual hot-plug event handling.

For virtual USB hubs which follow a device-driven control model, this is handled by an internal configuration manager which uses a device's internal resources or external buses and interfaces to dynamically provision the virtualized USB functions, either by restoring a previously-stored configuration (e.g., restoring from non-volatile RAM) or by discovering other devices attached to the bus or interface.

It is also possible for a virtual USB hub to utilize both control models (host-driven and device-driven) at the discretion of the device implementer. In this case, a device may have any combination of the following entities which can drive configuration: a control function, an internal resource for previously-stored configuration, and/or an external bus or interface.

Internal Architecture

The embodiments of virtual USB hubs disclosed herein embody a number of logical components, some of which are mapped to the physical or logical components of a classic USB hub, and some of which provide the unique capabilities necessary for managing the virtualized devices instantiated by the virtual USB hub.

These components include,

A physical upstream port (usually at port #0) which connects to a host computer via standard USB protocol.

Hub configuration, implemented by logic to expose the appropriate USB descriptors which contain the correct configuration for a hub (e.g. USB device class 09h) with a desired number of downstream ports (up to a maximum of 15 in some embodiments).

Logic to send port connect and disconnect messages for the available downstream ports, routed to the hub's Interrupt endpoint as per USB specifications.

Logic to instantiate at least one dynamic "virtual function" at any free port (e.g. ports #2-#15, or as many as implemented) and route packets to/from the virtual function, as if it were a USB device connected to its physical port.

Virtual function configuration, implemented by logic to expose the appropriate USB descriptors which contain the correct configuration to emulate both the fixed "control function" (if present) and a connected "virtual function" of any standard USB device class or a vendor-specified device class, with endpoint interfaces as desired; and Logic to control the instantiation and management of the virtual functions, necessary to create or destroy virtual functions and cause them to appear as plug-in or disconnect events on the remaining downstream ports.

Generally, the logic to control the instantiation and management of the virtual functions may be host-driven and/or device-driven, and include at least one of the following:

A host-accessible "control function" at a particular fixed port (e.g., Port 1), which implements host-driven virtual function management via 1) logic to instantiate the fixed-port control function and route packets to/from the control function, as if it were a USB device connected to its physical port; and 2) A command interface on a control endpoint within this control function, to accept and process commands from the host computer.

Internal logic to utilize an internal resource to store and apply saved configuration data, which implements device-driven virtual function management through use of 1) an internal resource (such as EEPROM) used solely for configuration, which can store and retrieve the saved configuration data; and 2) an internal resource (such as NVRAM or Flash) to contain metadata including active partitioning and configuration data, along with stored user data accessed via the device's functional behavior.

Internal logic to utilize an external interface (such as a bus or other I/O capabilities) to detect and expose various other externally-connected devices as virtual functions, which implements device-driven virtual function management through use of an external interface or bus (such as I3C, CAN or Ethernet) which can be used by internal logic to detect and communicate with various connected devices.

A primary aspect of the virtual USB hub architecture is, for all intents and purposes, to appear (to the host computer or other upstream device) and act as if it were a physical USB hub, for which the configuration, presence or behavior of its downstream devices can be adjusted or changed via to control the instantiation and management of the virtual functions. This control may be host-driven, in which case the device will instantiate a virtual USB device to serve as a control function and respond to commands sent to the control function's endpoint interface, via standard USB communication protocol (public or private). This control may also be device-driven, in which case the device will contain either internal configuration data or external bus or interface communications logic, and shall instantiate its own virtual functions, based either on its stored configuration data or any detected devices on the external bus or interface. In either case, the hub itself implements the expected behavior around creating or destroying its virtual functions as device hot-plug or disconnect events, in a manner that complies with the relevant USB hub specifications. Generally, device-driven configuration may be automatically-applied or manually-initiated, and may cooperate with host-driven configuration, as instantiated in a parallel or complementary control function.

As the behavior of the virtual USB hub and its virtualized devices is not dictated by the usual physical plug/unplug events used for conventional physical USB hubs, it becomes clear that not all of the internal connections between the upstream port and the virtualized devices need to be exactly emulated at the physical level (i.e., USB electrical protocol). This is embodied in a way by conventional USB hubs, which act as an intermediate device between the host computer and any USB devices connected to their downstream ports; since the USB electrical protocol is not directly connected between the host computer and the USB device in this configuration, the conventional USB hub must handle the physical layer (i.e. the USB electrical protocol) on both sides, and perform a modest amount of processing on upstream or downstream messages in order to deliver packets to the correct port for a given USB device's endpoint address (as well as its routing address, for USB 3.x hubs and devices) such that neither the host computer or the connected USB device needs to know there is a conventional USB hub between them, at a logical level.

In a similar fashion, as long as the physical upstream port of a virtual USB hub complies with the USB electrical protocol, the remainder of the logic inside the virtual USB hub needs only to emulate a USB hub at the logical level, and can bypass the physical layer for all logical (virtualized) functions within the virtual USB hub.

FIG. 1 shows a logical (high-level) implementation of one embodiment of an instantiation of a virtual USB hub 100, including the virtual "ports" which can connect to the various virtualized USB functions (appearing as devices). virtual USB hub 100 includes configuration logic 102, an upstream port 104 (labeled Port 0) coupled to a host computer 106, and a plurality of downstream virtual ports 108 (labeled as Ports 1, 2, 3, . . . 15 in this example). During operation of virtual USB hub 100, one or more downstream virtual port 108 may be dynamically allocated for (and logically connected to) a virtual function, such as depicted by virtual functions 110 and 112 to which Port 1 and Port 2 are respectively connected. Generally, virtual functions for which virtual downstream ports are dynamically allocated may be configured as needed, as depicted by logic blocks 114 and 116.

During ongoing operations of the virtual USB hubs disclosed herein, including virtual USB hub 100, a virtual function may be connected and disconnected, in a manner similar to connecting and disconnecting USB devices to USB ports in a conventional physical USB hub. This is illustrated in FIG. 1 by a disconnected virtual function 118 coupled to Port 3. Meanwhile, some of downstream virtual ports 108 may yet to be dynamically allocated for any virtual function, as depicted by Port 15. Such virtual downstream ports are analogous to downstream USB ports in a physical USB hub that are not connected to any USB device.

Figure 2:
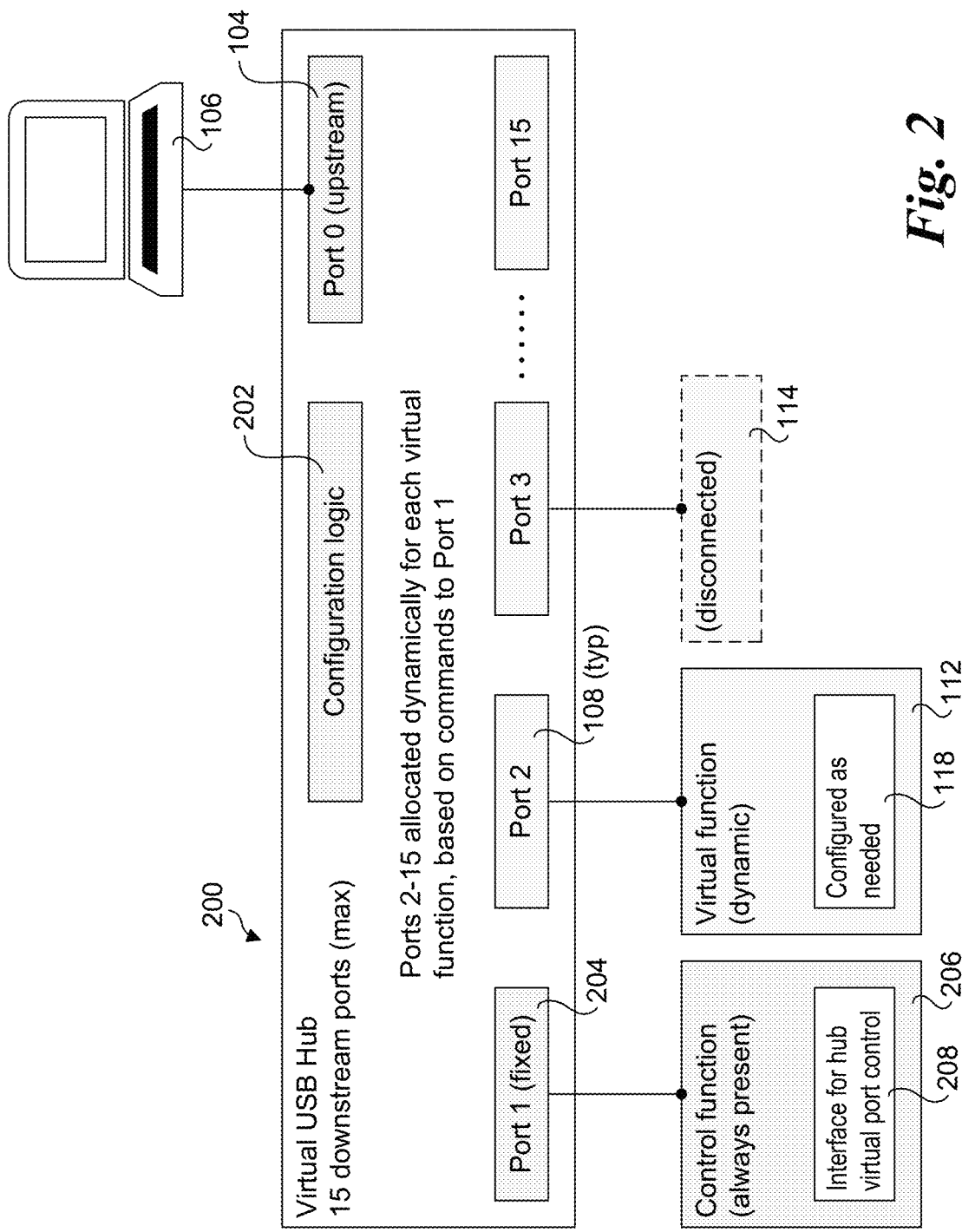
FIG. 2 is a block diagram of a virtual USB hub which provides an embodiment of a host-driven control model, with its control function containing the interface used by host software to configure the device and its virtualization capabilities.

While virtual USB hub 100 of FIG. 1 includes most of the components needed to implement a virtual USB hub, it does not show any components that are implemented to support to either a host-driven or device-driven control model. FIG. 2 shows a virtual USB hub 200 which provides an embodiment of a host-driven control model, with its control function containing the interface used by host software to configure the device and its virtualization capabilities. In a manner similar to virtual USB hub 100 of FIG. 1, virtual USB hub 200 includes configuration logic 202, an upstream port 104 (Port 0) coupled to a host computer 106, and a plurality of downstream virtual ports 108 (Ports 2, 3, . . . 15). In a manner similar to that shown in FIG. 1, Port 2 has been dynamically allocated for and is logically connected to virtual function 112 including a configurable logic block 116 and Port 3 is shown as being coupled to a disconnected virtual function 118.

In addition to dynamically allocated ports, a virtual USB hub may include downstream ports that are configured as fixed ports. As described above, a virtual USB hub may include a host-accessible control function at a particular fixed port, such as Port 1, which includes logic to instantiate the fixed-port control function and route packets to/from the control function, as if it were a USB device connected to its physical port; and the command interface on a control endpoint within the control function, to accept and process commands from the host computer.

An example of the foregoing is implemented by virtual USB hub 200, which is depicted as further including a fixed port 204 (Port 1) that is connected to an "always present" host-accessible control function 206. Control function 206 further includes a logic block 208 that includes the aforementioned logic to instantiate the fixed-port control function and the command interface on the control endpoint within control function 206.

Figure 3:
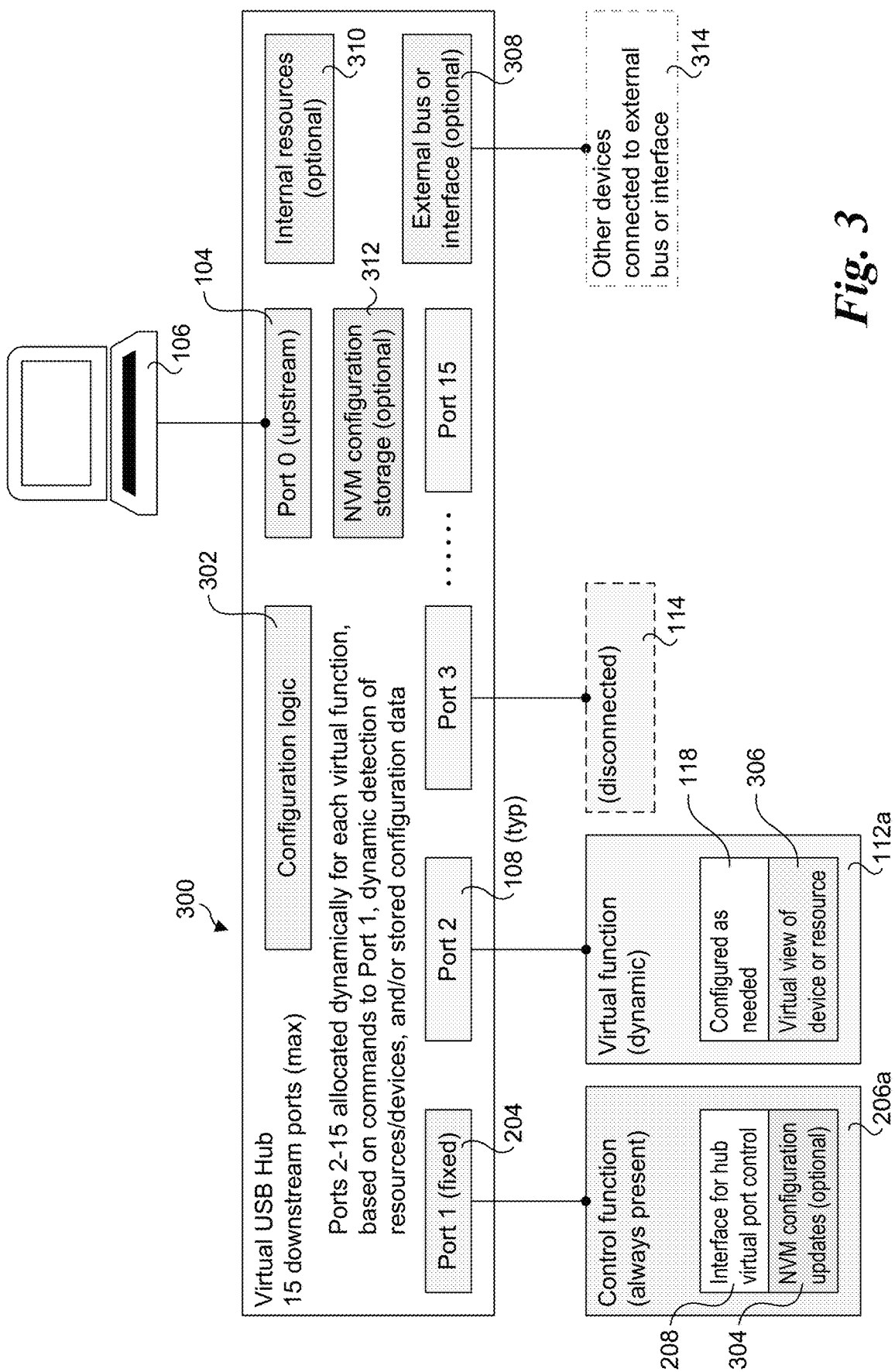
FIG. 3 is a block diagram of an enhanced version of a virtual USB hub with extended virtualization capabilities, according to one embodiment.

FIG. 3 shows an enhanced version of a virtual USB hub 300, including several optional features (described below) that add richer functionality to the device and enhance its utility by extending the virtualization capabilities, virtual USB hub 300 employs a more complex instantiation of the virtual USB hub, utilizing both host-driven and device-driven control models as well as the applicable entities to support these control model.

virtual USB hub 300 includes configuration logic 302, and upstream port 104 (Port 0) coupled to a host computer 106, a fixed downstream port 204 (Port 1), and a plurality of downstream virtual ports 108 (Ports 2, 3, . . . 15). Fixed downstream port 204 is connected to a control function 206a, which in addition to logic block 208 further includes an option NVM (non-volatile memory) configuration updates module 304. Downstream virtual Port 2 is connected to a virtual function 112a, which includes a module 306 that enables a virtual view of the device or resource emulated by virtual function 112a. As before, downstream virtual Port 3 is depicted as connected to a disconnected virtual function 114. As further illustrated in FIG. 3, virtual USB hub 300 provides dynamic detection of resources and devices and/or stored configuration data.

In addition to the components provided by virtual USB hub 200, virtual USB hub 300 is further depicted as including three optional components: an external bus or interface 308, internal resources 310, and NVM configuration storage 312. External bus or interface 308 is a physical bus or interface that may be connected to a physical device, as depicted other devices connected to external bus or interface block 314. In addition to the illustrated embodiment, a virtual USB hub may include multiple external buses or interfaces, each of which is configured to connect to a respective device having an interface compatible with the external bus or interface. It is further noted, that when multiple external buses or interfaces are implemented, they may include different types of external buses or interfaces as well as implementing the same type of devices or interfaces.

I3C Probe with USB Virtual Hub

In the following embodiment, an I3C probe is disclosed in which a virtual USB hub is implemented, and which comprises a USB device that acts as an I3C host controller. Moreover, this functionality is implemented over a single USB channel between the host and the I3C probe, while enabling concurrent connection to multiple I3C slaves and/or slave functions in a target system connected to the I3C probe via an I3C bus or a USB Type-C interface that allocates a pair of sideband pins to be used for implementing an I3C bus.

I3C, officially called MIPI I3C® and sometimes referred to as SenseWire and written 'I$_3$C', is an emerging industry standard for multidrop serial data buses that was developed by the Mobile Industry Processor Interface Alliance, which is a collection of mobile, electronics, and computer-related companies. (For convenience, MIPI I3C® will be referred to herein as 'I3C'.) I3C extends the capabilities of I2C in a number of ways, including higher bandwidth and reduced power, while also providing legacy support for I2C and utilizing a two-pin serial bus like used by I2C. As described by the MIPI Alliance, "MIPI I3C® is a bus interface for connecting sensors to an application processor. It is a core sensor integration technology that can combine multiple sensors from different vendors in a device to streamline integration and improve cost efficiencies." The specifications for MIPI I3C® are available at https://mipi.org/specifications/i3c-sensor-specification.

Figure 4:
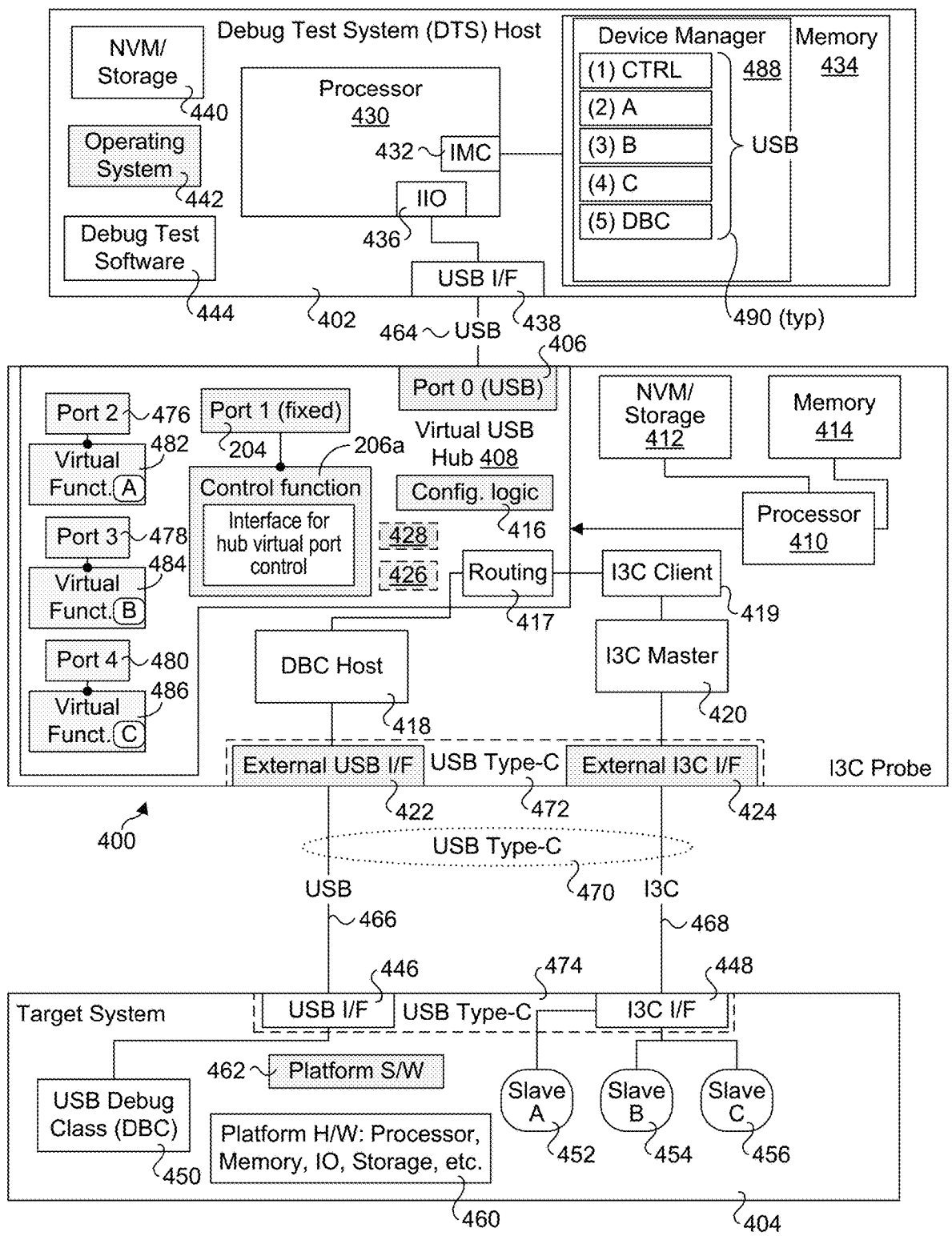
FIG. 4 is a schematic diagram illustrating a debug system including an IC3 probe coupled between a host computer comprising a debug test system (DTS) and a target system under debug, showing a first state under which three I3C slaves are virtualized as USB devices.

FIG. 4 shows a debug system including an IC3 probe 400 coupled between a host computer 402 (also referred to as the debug test system or DTS) and a target system 404. I3C 400 includes a upstream USB port 406 (Port 0), and emulated USB hub 408, a fixed downstream virtual port 204 coupled to a control function 206a, a processor 410, NVM/storage 412, memory 414, configuration logic 416, routing logic 417 a debug class (DBC) host 418, and I3C client 419, an I3C master 420, and external USB interface (I/F) 422, and an external I3C interface 424. I3C probe 400 may optionally include internal resources 426 and NVM configuration storage 428.

Debug test system 402 includes a processor 430 having an integrated memory controller (IMC) 432 coupled to system memory 434 and an Integrated Input Output (IIO) block 436 coupled to a USB interface 438. Debug test system 402 further includes non-volatile memory and/or storage 440, an operating system 442, and debug test software 444. Generally, debug test system 402 may be implemented using various types of host computer systems, including personal computers, laptops, notebooks, servers, and tablets, running operating systems that support USB communication and enumeration of USB endpoint devices, including but not limited to Microsoft WINDOWS™, Linux, UNIX, and Apple OS X™.

Target system 404 is depicted as including a USB interface 446, an I3C interface 446, USB DBC logic 450 and a plurality of I3C devices 452, 454, and 456, which are referred to as I3C "slaves" when operated as a slave under the MIPI I3C Master/Slave architecture and respectively labeled Slave 'A', 'B', and 'C'. Target system 404 may generally comprise some type of computer device for which debug testing is to be performed, including but not limited to personal computers, laptops, notebooks, servers, tablets and various types of mobile devices such as smartphones. Each of these target systems will have hardware components including a processor, system memory, IO facilities, storage, and various software including an operating system the run on the hardware. For convenience, these hardware components and operating system are collectively depicted in a platform hardware block 460, and a platform software (S/W) block 462.

Debug test system 402 is coupled to I3C probe 400 via a USB link 464 facilitated by USB interfaces 406 and 438. Generally, USB link 464 and USB interfaces 406 and 438 may comprise any existing or future USB interface, including a USB 2.0, USB 3.0, and USB Type-C interface and link.

In the illustrated embodiment of FIG. 4, I3C probe 400 is coupled in communication with target system 404 via a USB link 466 connected between external USB interface 422 and USB interface 446, and by an I3C bus 468 connected between external I3C interface 424 and I3C interface 448. Optionally, a single USB Type-C link may be used to support communication between I3C probe 400 and target system 404, as depicted by a USB Type-C link 470 and the dashed blocks corresponding to USB Type-C interfaces 472 and 474.

USB Type-C™, also referred to as USB-C™, defines a 24-pin interface including four SuperSpeed differential pairs for normal communication and two SBU (Sideband Use) pins (SBU1 and SBU2) for out-of-band (sideband) and debug applications. Under one embodiment, one or more of the SuperSpeed differential pairs is used to support communication over USB link 466, while the SBU pins SBU1 and SBU2 are used to implement a two wire I3C serial bus corresponding to I3C bus 468.

Under the embodiment illustrated in FIGS. 4, 4b, 4d, and 6, the I3C slave devices operate as I3C endpoints (as used herein, an endpoint means the ultimate destination of a communication between a sender and a receiver, noting and endpoint may also operate as sender). Generally, an I3C slave device may implement one or more function (referred to herein as slave functions or simply functions). Under an alternative approach shown in FIGS. 4a, 4c, and 6a, the I3C slave functions operate as the I3C endpoints.

Figure 4A:
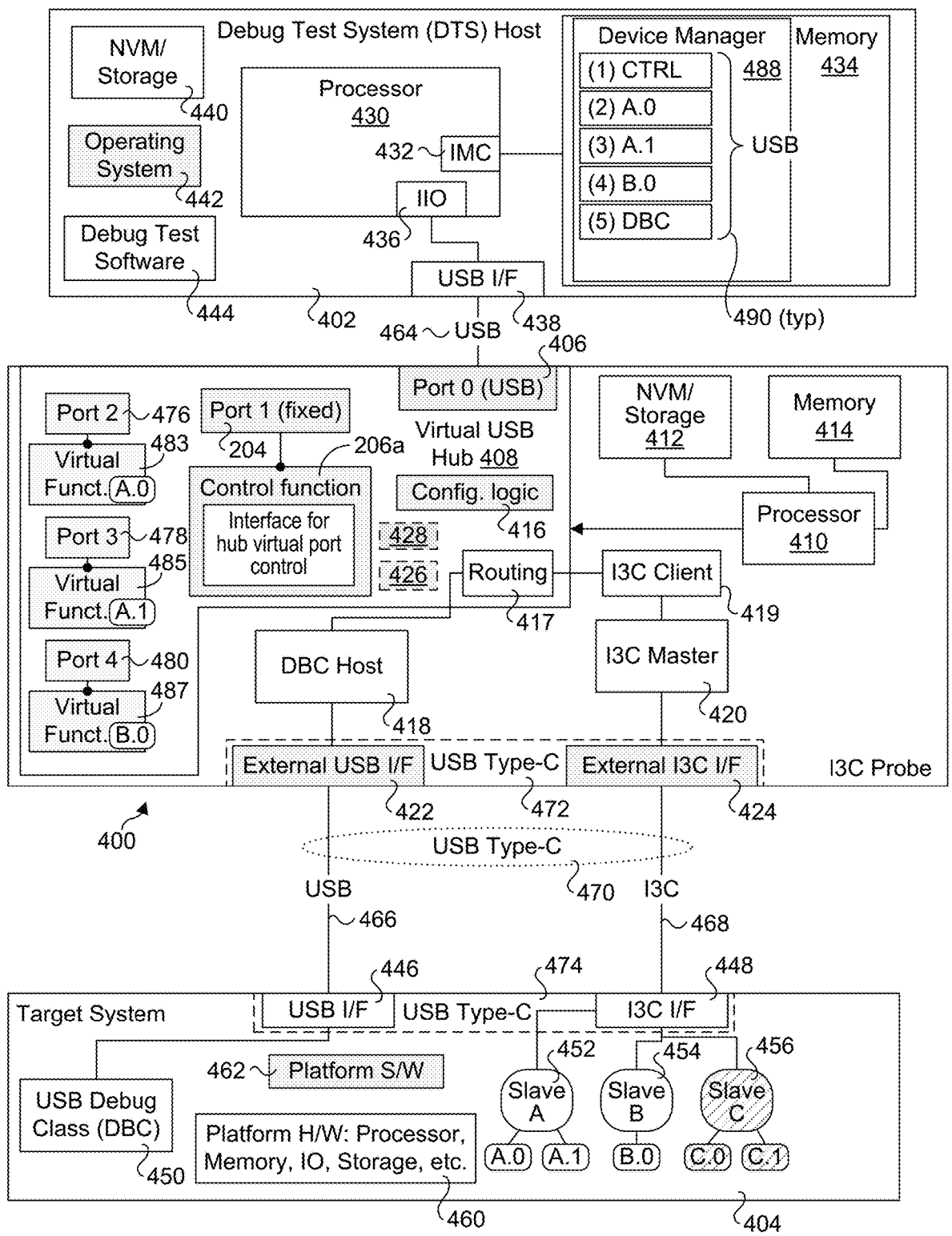
FIG. 4a is a schematic diagram illustrating a first state of a variant of the debug system of FIG. 4 under which three I3C slave functions are virtualized as three USB devices.

For example, FIG. 4a shows various slave functions connected to I3C slave devices that implement the slave functions, as depicted by slave functions A.0 and A.1 for Slave 'A', a slave function B.0 for Slave 'B', and slave functions C.0 and C.1 for Slave 'C'. FIG. 4a further illustrates another aspect relating to the ability to dynamically activate and deactivate IC3 endpoints during runtime operations. The functionality enables a virtual USB hub to effectively exceed the 15 downstream USB port limit (defined by USB specifications) while connected to a host, such as DTS 402. As will be described below in further detail, the virtual USB hub is enabled to dynamically reallocate downstream virtual ports to I3C endpoints in response to changes in the activation states of various I3C slaves in the target system.

Figure 5:
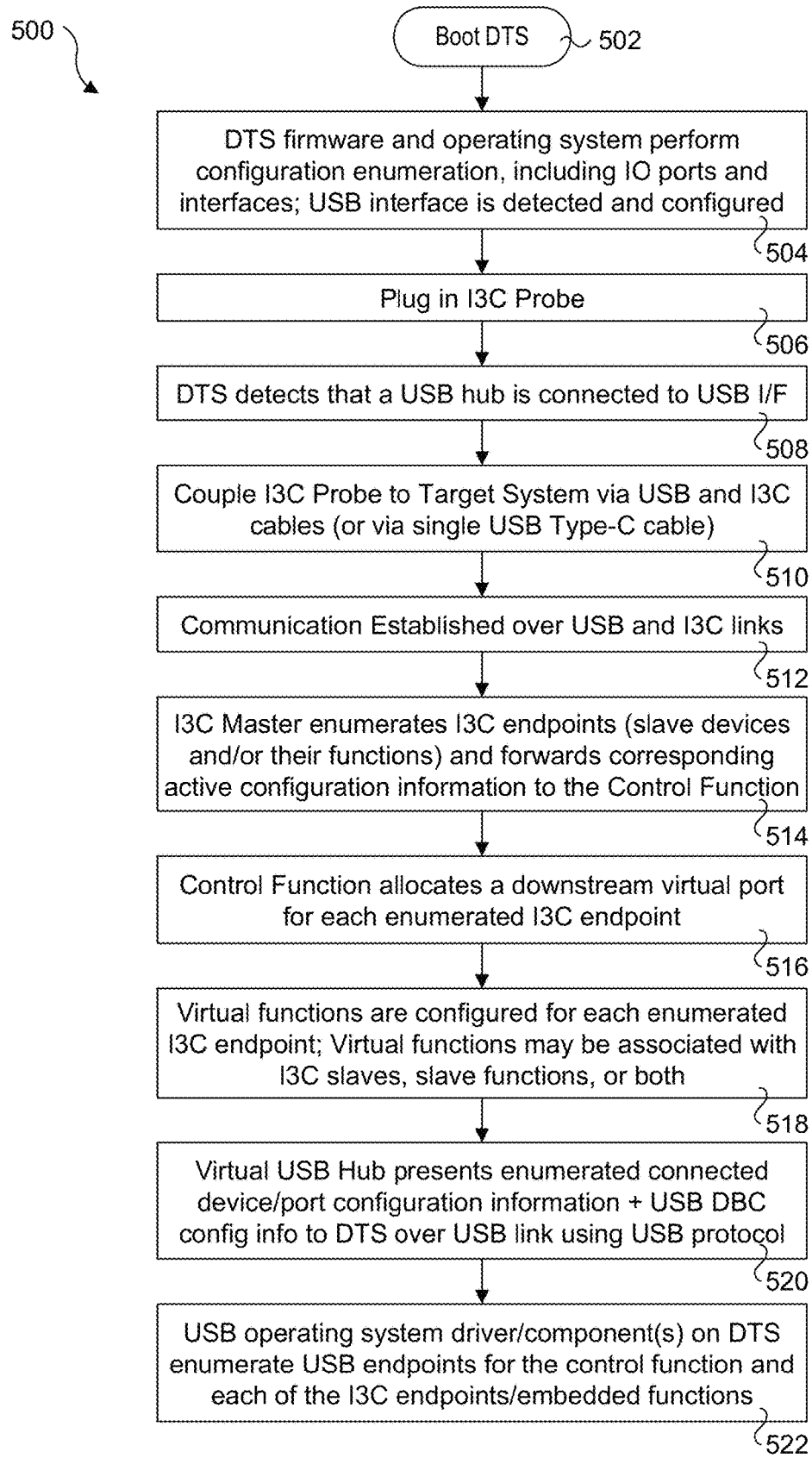
FIG. 5 is a flowchart illustrating operations performed by the DTS 402, I3C probe, and target system when the debug system is initially connected, according to one embodiment.

FIG. 5 shows a flowchart 500 illustrating operations performed by DTS 402, I3C probe 400, and target system 404 when the system is initially connected. The process begins in a start block 502 with the DTS booting. During the boot process, well-known conventional firmware and operating system boot operations will be performed, including configuration enumeration of the various IO ports and interfaces for the DTS host computer. This will include enumeration of any USB interfaces, including USB interface 438 which is detected and initially configured in accordance with its USB type, as depicted in a block 504. For example, if USB interface 438 is a USB 3.0 interface than DTS will configure an appropriate USB 3.0 driver to be used for communication USB interface 438. If USB interface 438 is a USB-C interface, then a USB-C driver will be configured and used for communication.

Next, in a block 506, the I3C probe is plugged in (i.e., connected to USB interface 438 via an applicable USB cable, such as a USB 3.0 or USB-C cable). Optionally, I3C probe may be plugged prior to booting the DTS. Since USB supports "hot-plug" functionality, a USB interface (and applicable software) is designed to detect and automatically configured various types of USB endpoint devices that are plugged into USB interfaces. Accordingly, in response to I3C probe 400 being connected to DTS 402 (e.g., using an appropriate USB cable), the DTS will detect that a USB device has been plugged in to USB interface 438, as depicted by a block 508. Moreover, virtual USB hub 408 will provide information using the USB protocol identifying I3C probe 400 as a (physical) USB hub. In other words, from the perspective of the DTS, a standard USB hub has been connected (plugged in to) USB interface 438.

In a block 510 the I3C probe is coupled to the target system using either individual USB and I3C cables or a single USB-C cable. Optionally, these/this cable(s) could be plugged in before connecting the I3C to the DTS. In some embodiments, the I3C probe will be powered exclusively over USB, which generally provides sufficient power to operate most USB endpoint devices, including USB hubs depending on how many USB devices are connected to the downstream USB ports. As an option, the I3C probe may be powered using a separate power source, such as a DC power supply or a battery (not shown). It is noted that for an I3C probe that is exclusively powered over USB, plugging the target system into the I3C probe before the I3C probe is plugged into the DTS will not result in any operations being performed by the I3C probe at that point, since it will not be powered.

Figure 7:
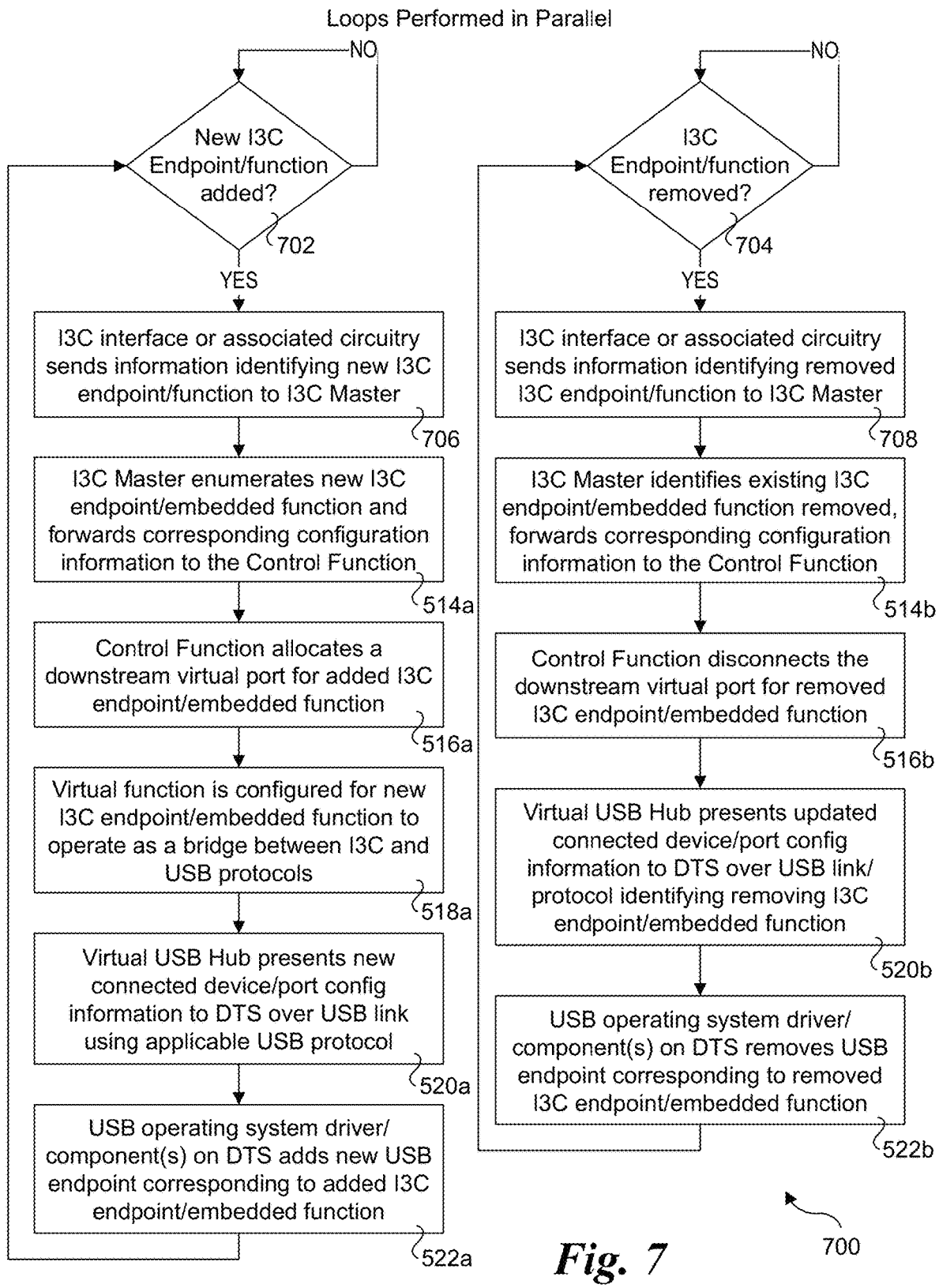
FIG. 7 is a flowchart illustrating operations and logic for adding and removing I3C endpoints to the debug system of FIGS. 4, and 4a-4d, according to one embodiment.

As depicted in a block 512, following some link initialization operations that are automatically performed via the applicable USB and I3C interfaces, communication will be established over the USB and I3C links (or over the single USB-C link). As depicted in a block 514, once communication is established, I3C master 420 will communicate over I3C bus 468 to enumerate any I3C slaves that are connected to I3C interface 448, and forward corresponding I3C active configuration information to control function 206a. It shall be recognized that some I3C slaves are also hot-pluggable, and thus the number and type of I3C slaves may vary during debug test operations, as described below with reference to FIG. 7. Moreover, as discussed above, under some embodiments I3C slaves (and/or the slaves' functions) may be dynamically activated and deactivated using either I3C messages sent from I3C master 420 or target system configuration messages sent to USB debug class 450. Accordingly, in one embodiment the configuration information passed to the control function only corresponds to I3C endpoints that are currently active.

An example of this difference is shown in FIG. 4a, where Slave 'C' and its functions C.0 and C.1 are depicted in an inactive state. Under one embodiment, the I3C master will enumerate all of Slaves 'A', 'B', and 'C' (and/or all of slave functions A.0, A.1, B.0, C.0 and C.1), but will only forward configuration information corresponding to active Slaves 'A' and 'B', or active slave functions A.0, A.1 and B.0 if the slave functions are being used as the I3C endpoints.

Figure 6:
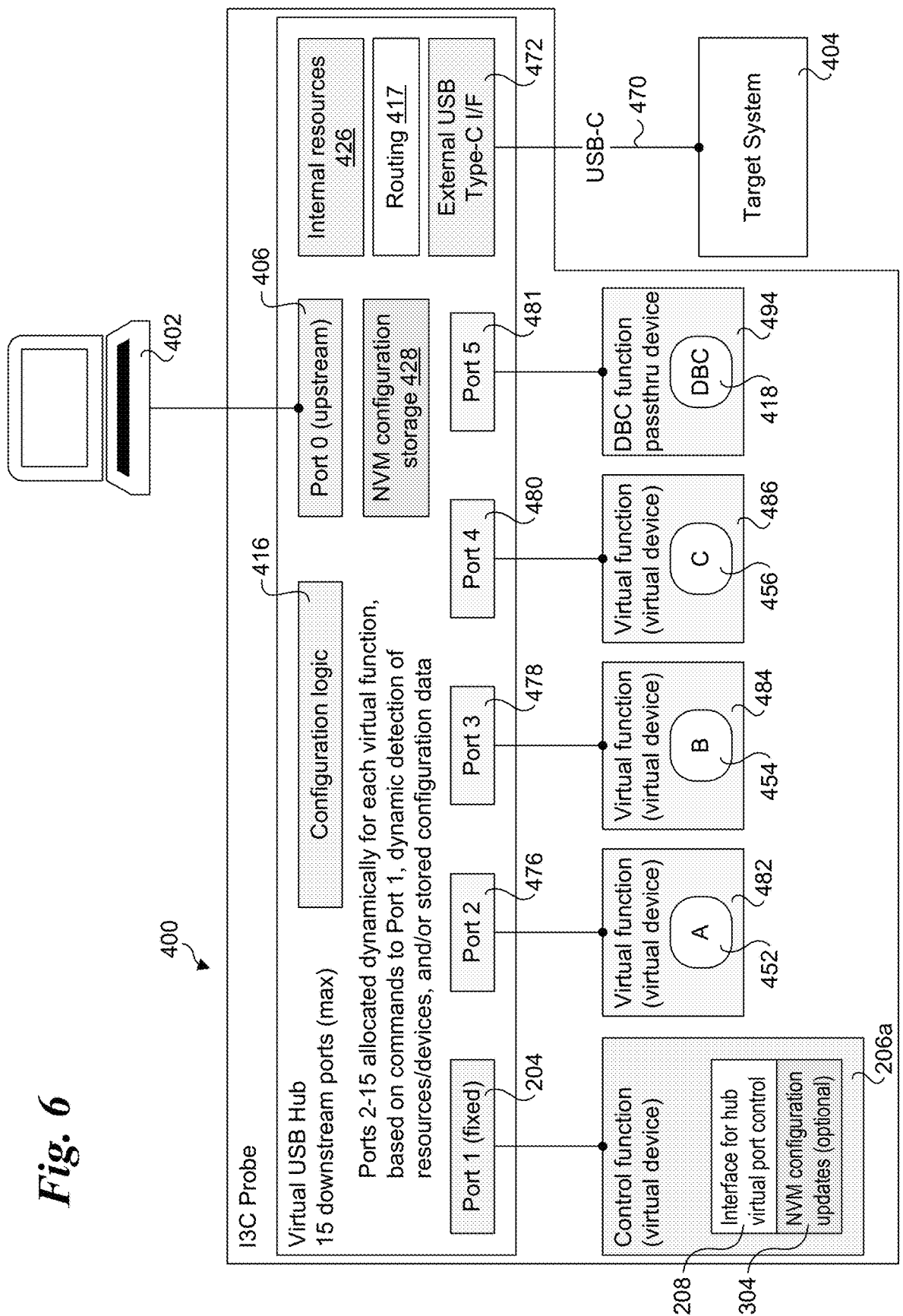
FIG. 6 is a block diagram illustrating a view of the virtual USB hub corresponding to the state of the debug system illustrated in FIG. 4.
Figure 6A:
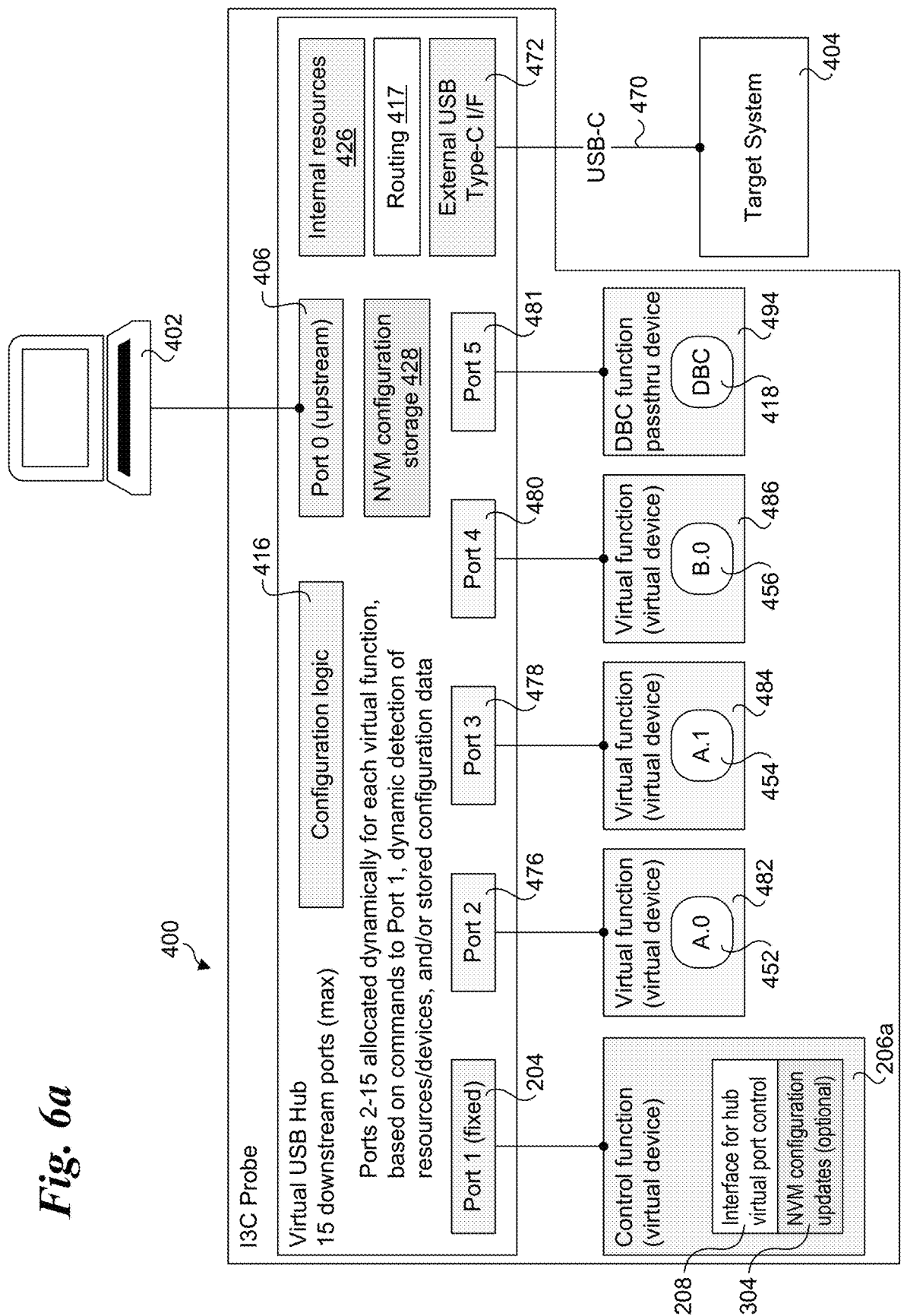

In a block 516, control function 206a dynamically allocates a downstream virtual port for each enumerated I3C endpoint. In the embodiment of FIGS. 4 and 6, I3C slave devices are used as I3C endpoints, and thus Slave 'A', 'B', and 'C', are depicted in these figures as being connected to downstream virtual ports 476, 478, and 480 (Ports 2, 3, and 4). In the embodiment of FIGS. 4a and 6a, I3C slave functions are the enumerated I3C endpoints, and thus slave functions A.0, A.1, and B.0 are depicted as being connected to downstream virtual ports 476, 478, and 480. Corresponding virtual functions are then respectively configured for each downstream virtual port, as depicted in a block 518. The result of this operation is shown in FIGS. 4 and 6 as virtual functions 482, 484, and 486, which are respectively connected to downstream virtual ports 476, 478, and 480. For the embodiment of FIGS. 4a and 6a, the virtual functions are depicted as virtual functions 483, 485, and 487, which are respectively connected to downstream virtual ports 476, 478, and 480.

In a block 520, the virtual USB hub embedded in I3C probe 400 (collectively depicted as USB hub 408 for simplicity, with further details shown in FIGS. 6 and 6a) presents the enumerated connected device/port configuration information as virtual USB configuration information to the DTS over USB link 464 using an applicable USB protocol. The virtual USB configuration information enumerates the dynamically allocated downstream virtual ports as physical USB ports, with each of these USB ports being associated with a corresponding USB function. In addition, USB port (interface) enumeration information corresponding to external USB interface 422 and USB DBC 450 is also transferred over USB link 564 to the DTS.

Upon receipt of the information sent to the DTS in block 520, applicable USB operating system software components, such as a USB OS driver in a USB software stack, process the received enumerated virtual USB configuration information in a block 522 to update the system configuration information in the OS device manager 488, as well as update associated USB resource configuration information that is not shown that is exposed by the operating system to enable software running on the DTS to access those USB resources. This will include new USB device manager entries 490, as depicted by entries labeled 'CTRL' for control function 206a, 'A', 'B', and 'C', for respective I3C slave 'A', 'B', and 'C', and 'DBC' entry corresponding to USB DBC 450 in FIG. 4, and as depicted by entries labeled 'CTRL' for control function 206a, 'A.0', 'A.1', and 'B.0', for respective I3C slave functions A.0, A.1, and B.1, and 'DBC' entry corresponding to USB DBC 450 in FIG. 4a.

FIGS. 6 and 6a show architecture diagrams illustrating another view of the physical and logical components and associated functionality implemented by the virtual USB hub 408 embedded in I3C probe 400 in FIGS. 4 and 4a, respectively. As shown, a virtual port 481 (Port) 5 is allocated for a virtual function 494 associated with DBC host 418. In the illustrated embodiments, USB Type-C link 470 between external USB Type-C interface 472 and target system 404 is shown; however, it will be understood that separate USB and I3C links may be used, such as illustrated in FIG. 4 and discussed above.

During subsequent run-time operations, various I3C slaves may be added or removed from a target system, either by physical attachment and disconnection, or programmatically by activate and deactivating I3C slaves and/or slave functions that are embedded in the target system. In response, the I3C probe will detect the change (added or removed I3C slave and/or slave function(s)) and corresponding port/device configuration information will be generated and provided to the DTS, which will then update its attached USB device information to reflect the change. Corresponding operations and logic for implementing these functions are depicted in a flowchart 700 of FIG. 7. As depicted by the right-hand and left-hand loops, the illustrated operations and logic are implemented in an ongoing manner in parallel.

In a decision block 702 a determination is made to whether a new I3C endpoint has been added. In practice, in some embodiments the addition of a new I3C slave (or activation of an existing previously inactive I3C slave or slave function) would be detected by I3C interface 448 or some associated circuitry that is not shown; however, for illustrative purposes, this is depicted as decision block 702, which is continuously being evaluated as shown by the NO loop back to decision block 702. Alternatively, in cases where an I3C master effects the change by activating an I3C slave or slave function, the I3C master will already have information relating to the updated I3C configuration. In response to detection of an added I3C slave, the answer to decision block 702 would be YES, and the logic would proceed to perform the operations in blocks 706, 514a, 516a, 518a, 520a, and 522a, as shown in the left-hand outer loop.

In block 706, I3C interface 448 (or the associated circuitry) sends information over I3C bus 468 to I3C master 420 identifying the new I3C slave that has been added (if the I3C master doesn't already have configuration information identifying the added I3C endpoint). In block 514a, I3C master 420 enumerates information associated with the new I3C slave or slave function(s) and forwards corresponding configuration information to control function 206a. In block 516a, control function 206a allocates a downstream virtual port for the added I3C slave, or, alternatively, for each added slave function, while in block 518a a corresponding virtual function is configured for the new I3C slave to operate as a bridge between the I3C and USB protocols. In block 520, the virtual USB hub presents new connected device/port configuration information comprising an update to the virtual USB configuration information to DTS 402 over USB link 464 using an applicable USB protocol. In response to receiving this updated virtual USB configuration information, the USB operating system driver/component(s) on the DTS adds a new USB device or function entry in the Device Manager configuration corresponding to the added I3C slave (or added slave function), as depicted in block 522a. The logic then loops back to decision block 702, and the processes is repeated.

Figure 4B:
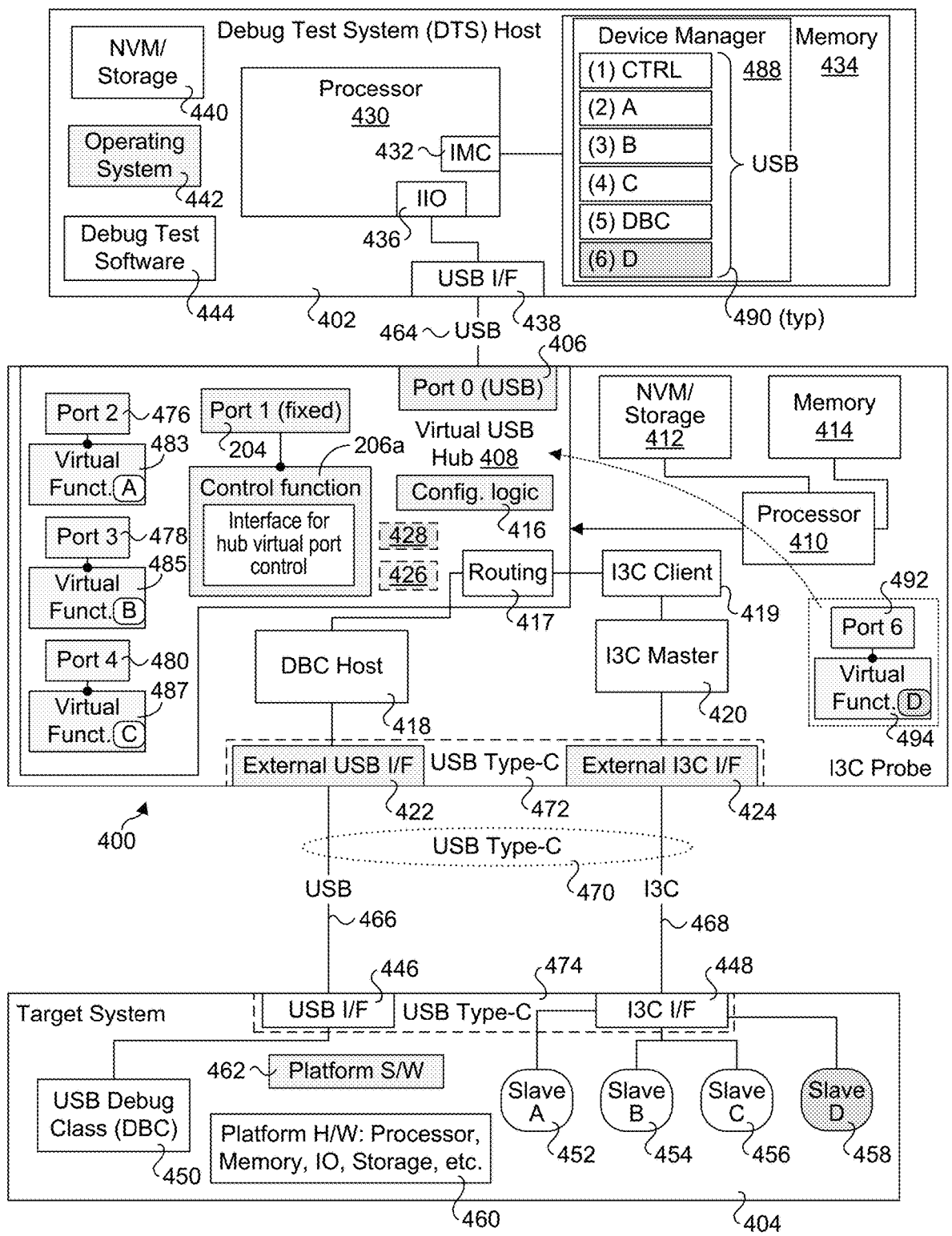
FIG. 4b is a schematic diagram illustrating a second state of the debug system of FIG. 4 under which a fourth I3C slave has been added.

As example of adding a new I3C slave is shown in FIG. 4b. As illustrated, a new I3C slave 458 (also referred to I3C slave 'D') has been added. In response, information identifying added endpoint 'D' is forwarded from I3C interface 448 over I3C bus 468 to I3C master 420 (block 706). I3C master 420 enumerates a new I3C slave and forwards corresponding configuration information to control function 206a (block 514a). Control function 206a then allocates a new downstream virtual port 493 (Port 6) in block 516a, and a corresponding virtual function 494 is configured for the new I3C slave 'D'. The virtual USB hub then present new connected device/port configuration information corresponding to new I3C slave 'D' to DTS 402 over USB link 464, wherein the information identifies a new USB Port 6 has been added and is used to access a USB endpoint (device) 'D' which is representative of new I3C slave 'D'. This information is processed by the OS USB driver in block 522a to update the Device Manager 488 configuration, which now includes a new USB endpoint 'D' (shown in gray).

An example of adding an I3C slave is shown in FIG. 4a. As illustrated, a new I3C slave 458 (also referred to I3C slave 'D') has been added. In response, information identifying added I3C slave 'D' is forwarded from I3C interface 448 over I3C bus 468 to I3C master 420 (block 706). I3C master 420 enumerates a new I3C slave and forwards corresponding configuration information to control function 206a (block 514a). Control function 206a then allocates an available downstream virtual port 493 (Port 6) in block 516a, and a corresponding virtual function an virtual device 494 is configured for the new I3C slave 'D'. The virtual USB hub then present new connected device/port configuration information corresponding to a virtualized representation of I3C slave 'D' to DTS 402 over USB link 464, wherein the information identifies a USB Port 6 has been added and is used to access a USB endpoint (device) 'D' which is representative of new I3C slave 'D'. This information is processed by the OS USB driver (and/or other USB software stack components) in block 522a to update the Device Manager 488 configuration, which now includes a new USB endpoint 'D' (shown in gray). Corresponding USB device configuration information is also exposed by the operating system to enable software running on the DTS to access I3C slave 'D' using USB communications between the DTS and the I3C probe.

As discussed above, removal of I3C slaves and/or corresponding slave functions is also supported. For illustrative purposes, detection of such events is depicted by a decision block 704, in which a determination is made to whether an I3C endpoint/function has been removed. If the answer is YES, the logic proceeds to perform the operations depicted in blocks 708, 514b, 516b, 520b, and 522b; otherwise, the logic loops back to decision block 704.

In block 708, I3C interface 448 (or the associated circuitry) sends information over I3C bus 468 to I3C master 420 identifying the I3C endpoint that has been removed. In block 514b, I3C master 420 identifies an existing I3C endpoint has been removed and forwards corresponding configuration information to control function 206a. In block 516b, control function 206a disconnects the downstream virtual port for the removed I3C endpoint. In block 520b, the virtual USB hub presents updated connected device/port configuration information to DTS 402 over USB link 464 identifying the virtual USB device corresponding to the I3C endpoint that has been removed. In response to receiving this information, the USB operating system driver/component(s) on the DTS removes the corresponding USB device entry in the Device Manager configuration corresponding to the I3C endpoint that has been removed. The logic then loops back to decision block 704, and the processes is repeated.

Figure 4C:
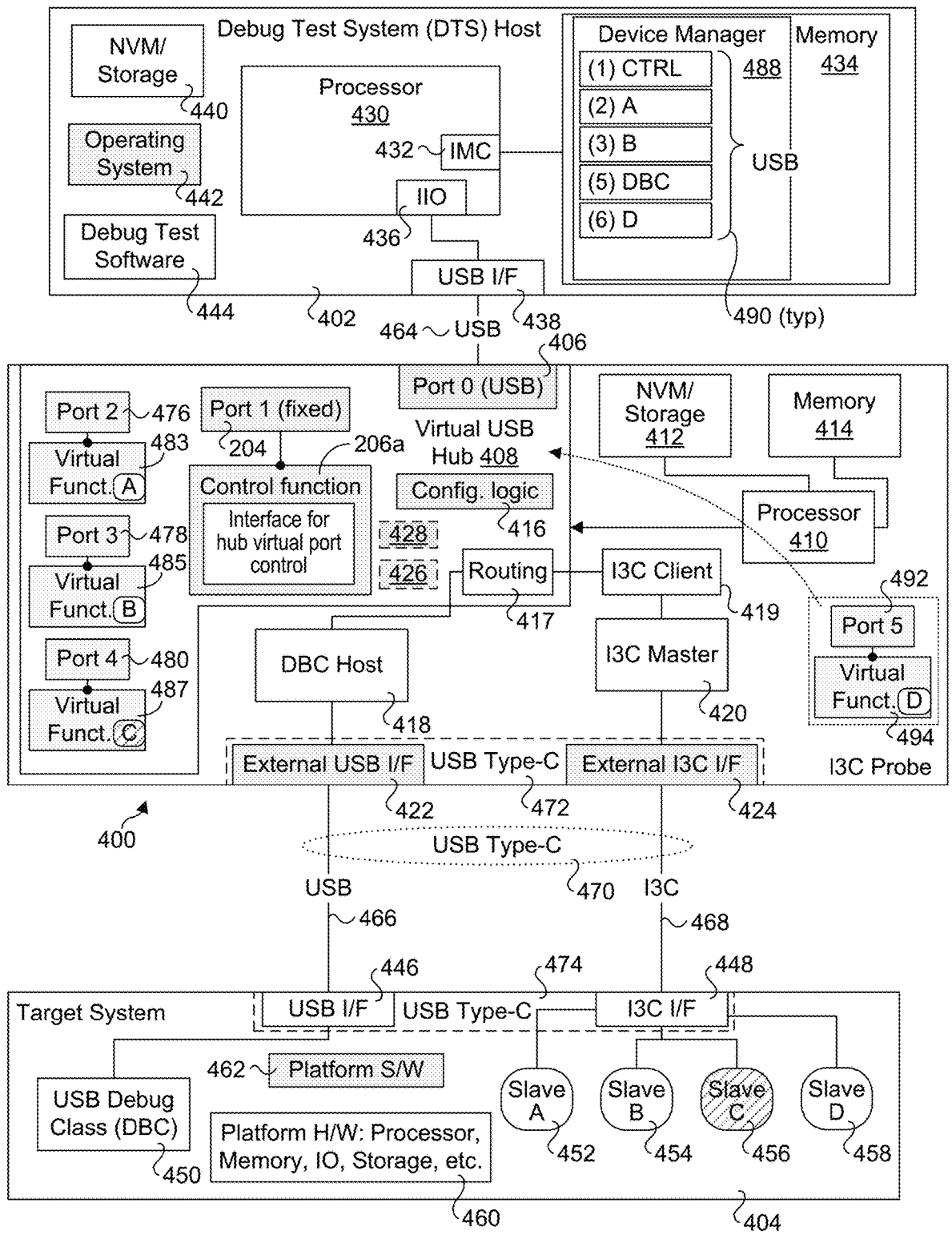
FIG. 4c is a schematic diagram illustrating a third state of the debug system of FIG. 4 under which one of the I3C slaves has been removed.

An example illustrating the changes in configuration as a result of removal of an I3C slave is shown in FIG. 4c. In this example, I3C slave 'C' has been removed, which may be detected by I3C interface 448 or other associated circuitry that is not shown (or through some other means). In response, I3C interface 448 (or the associated circuitry) will send information identifying I3C slave 'C' has been removed over I3C bus 468 to I3C master 420 (block 708) (If the I3C master does not already have this information). I3C master 420 will then forward corresponding updated configuration information to control function 206a indicating that I3C slave 'C' has been removed in block 514b. Control function 206a then disconnects the downstream virtual port for I3C slave 'C' (which in this case is Port 4) in block 516b. Since I3C slave 'B' may be reattached (or otherwise reactivated) at some subsequent point during a given session, in one embodiment the control function flags virtual function 484 as inactive. Alternatively, any resources allocated for virtual function 484 are released, which results in removal of virtual function 484.

In block 520b, the virtual USB hub presents updated connected device/port configuration information to DTS 402 indicating that USB endpoint 'C' has been removed. The USB operating system driver/component(s) then provides corresponding updated USB connected device information to Device Manager 480, which removes USB endpoint 'C' from the Device Manager view.

In addition to adding and removing I3C slaves, I3C endpoints comprising slave functions may also be added and removed. Moreover, in some circumstances it may be necessary to remove I3C slaves and/or one or more of their functions to accommodate new slaves and/or functions while staying within the 15 downstream port limitation for USB hubs.

Figure 4D:
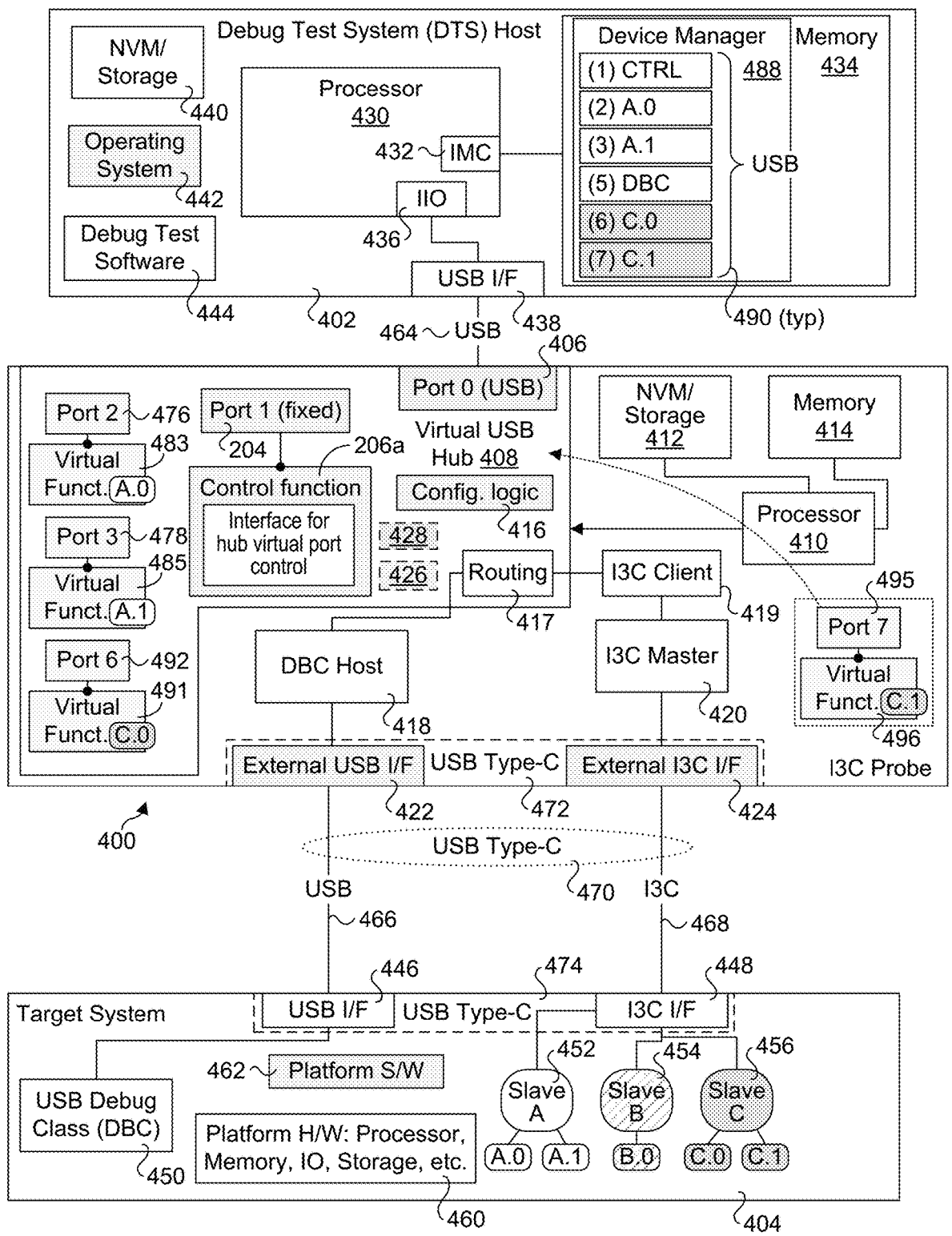
FIG. 4d is a schematic diagram illustrating a second state of the debug system of FIG. 4a under which one of the I3C slave functions has been removed and two I3C slave functions have been added.

As example of adding and removing I3C endpoints comprising slave functions is shown in FIG. 4*d*. In this example, slave 'B' and its function B.0 is removed (e.g., deactivated if slave 'B' is embedded in target system 404 or disconnected if attached to the target system), while slave 'C' and its functions C.0 and C.1 are added by changing the activation state of slave 'C' from a previous inactive state to an active state. In response to removing function B.0, updated connected device/port configuration information reflecting this change is provided to DTS 402, which results in function B.0 being removed from the list of USB devices/functions in device manager 488.

Adding functions C.0 and C.1 effects similar changes to adding an IC3 slave, except virtual ports are allocated for the added functions rather than the added slave. As shown in FIG. 4*d*, virtual port 492 (Port 6) is allocated for slave function C.0, and a corresponding virtual function 491 is configured. Similarly, a virtual port 495 is allocated for slave function C.1, and a corresponding virtual function 496 is configured for slave function c.1. Corresponding connected device/port configuration information is then provided to DTS 402, which results in functions C.0 and C.1 being added to the list of USB devices/functions in device manager 488.

Figure 8:
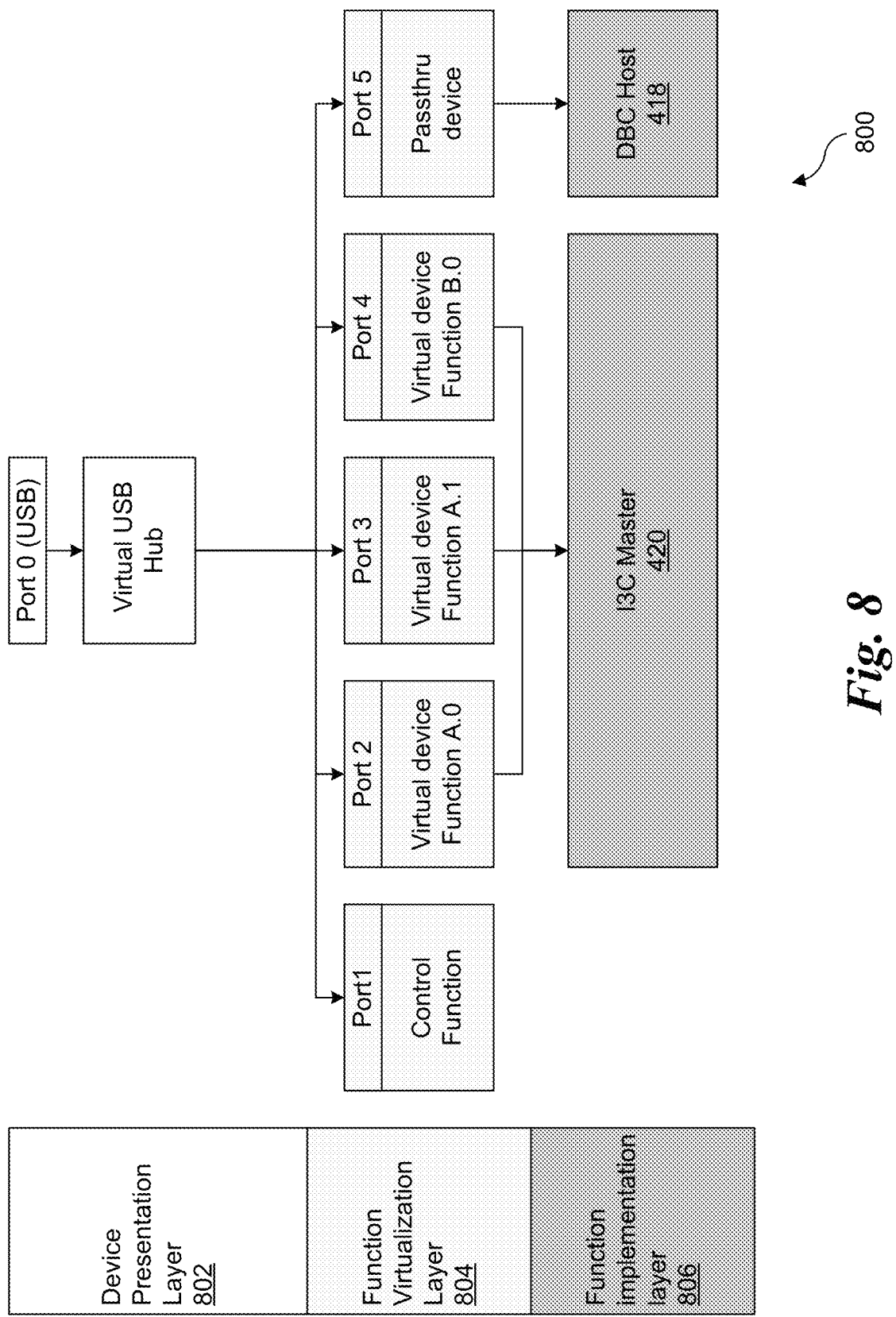
FIG. 8 is a block diagram illustrating a layered architecture under which the middle function virtualization layer operates as an abstraction layer that abstracts functions in a function implementation layer from the view of those functions presented to devices in a device presentation layer.

Another aspect of the virtual USB hub is that it implements a layered architecture that abstracts the underlying functions from the USB host. This is illustrated by layered architecture 800 in FIG. 8, which includes a device presentation layer 802, a function virtualization layer 804 and a function implementation layer 806. As illustrated, Port 0 (the USB upstream port) and a virtual USB hub including routing logic to route data to the virtual downstream ports are implemented in device presentation layer 802. Function virtualization, which includes the downstream virtual ports (depicted as Ports 1-5) and the virtual functions and devices associated with the downstream virtual ports are implemented in functional virtualization layer 804, which operates as an abstraction layer that abstracts the details of the functions in function implementation layer 806 from device presentation layer 802. Functions, including I3C master 420 and DBC host 418, are implemented in function implementation layer 806. This abstracted, layered approach enables the host to use standard USB software and hardware components, including standard USB drivers.

Figure 9:
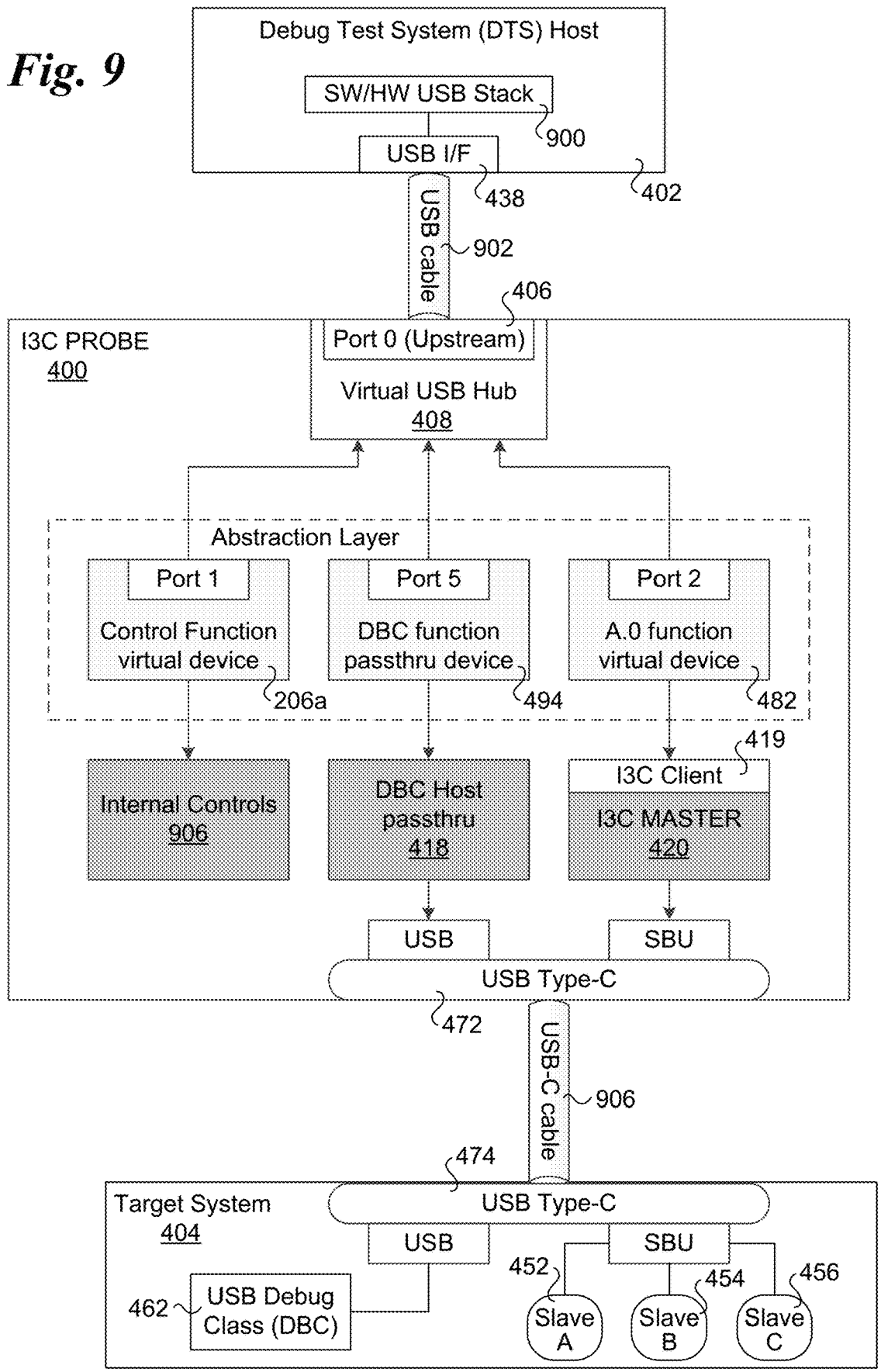
FIG. 9 is a schematic diagram illustrating data paths implemented for the debug system of FIGS. 4, and 4a-4d, according to one embodiment.

FIG. 9 schematically depicts communication data paths implemented in IC3 probe 400, according to one embodiment. As shown, DTS 402 is connected to Port 0 (the upstream USB port 406) on I3C probe 400 via a USB cable 902. Generally, USB cable 902 may be a USB Type A to B cable, or a USB Type-C cable may be used, depending on the bandwidth requirements for the implementation and/or other considerations. For example, use of a Type C cable allows SBU signals to travel back on non-SBU USB pins. In the illustrated embodiment, a USB Type-C cable 904 is used to connect I3C probe 400 to target system 404 via respective USB Type-C interfaces 472 and 474 on the I3C probe and target system.

As illustrated, the DBC is mostly a passthrough path; however, it is handled a little differently than with a conventional USB hub (which will block DBC). The I3C and DBC functions communicate upward to the associated virtual device abstraction layer via the virtual ports allocated for a given I3C slave or function and the DBC function. In this example, the virtual function corresponds to I3C slave function A.0 and uses Port 2, while the DBC function uses Port 5. Other I3C endpoints would use similar paths, such as illustrated by Ports 3, 4, 6, and 7 in FIGS. 4, and 4*a*-4*d*. As discussed above and shown in FIG. 9, the I3C communications between I3C master 420 and I3C slaves and functions in the target may be sent over a USB Type-C cable (and interface) that is also used for communication between DBC host 418 and USB DBC 450 in target system 404.

In the embodiments illustrated in FIGS. 4 and 4*a*-4*d*, various functions implemented by the virtual USB hub are implemented using a firmware and/or software executed on an embedded processor. However, this is merely exemplary, as other means for implementing the functionality of the virtual USB hub embodiments described herein may be used.

For example, the virtual USB hub architecture may be implemented in a number of formats, including but not limited to the following:

A custom-designed ASIC, for use in an external device such as a USB hub, "docking station" or "port replicator", or any other integrated or composite device;

An IP (intellectual property) block or logical functional unit (or multiple IP blocks or functional units) embedded in a System on a Chip (SoC), PCH (Platform Control Hub) or other system-interconnected silicon as an internally designed feature of a standard PC platform or other computing platform;

A combination of existing or future USB device controllers (which may be programmable or customizable) integrated with other programmable logic devices or microcontrollers via an interface or logical "gasket";

A solution implemented in programmable logic devices (e.g., one or more Field Programmable Gate Arrays (FPGAs) and/or microcontrollers;

Other means for implementing embedded logic, such as a combination of one or more of IP blocks, logical functional units, embedded processing elements (processors, microcontrollers), FPGAs, etc.

As will be recognized by those skilled in the art, some aspects of a virtual USB hub, such as the physical ports and/or interfaces (USB upstream port and any external downstream port or interface) may be implemented using well-known components and/or using IP blocks that are readily available for license. Accordingly, details for implementing such well-known components and circuitry are not described herein.

In addition to the foregoing embodiments, a virtual USB hub may implement various other features and capabilities, as outlined in the following paragraphs.

Enhanced Connectivity

The following features relating to enhanced connectivity may be implemented in some embodiments:

Multiple physical upstream ports, which could connect to more than one host computer, for flexible configuration of virtual functions which could be switched among the connected host computers as desired.

Support for future USB 3.x specifications, or other USB generations (not yet defined).

Support for the USB On-The-Go (OTG) specification.

Support for DisplayPort or Thunderbolt traffic on the same USB cable used to connect the physical upstream port to the host computer.

"Pass-through" support to downstream USB ports.

Bridge support to dedicated DisplayPort or Thunderbolt downstream ports.

Support for direct-wired USB downstream devices attached to I/O pins of physical downstream ports (if they exist).

Power and Performance

The following features relating to power and performance may be implemented in some embodiments:

A power-delivery downstream port (which could be "charging-only") to connect to a mobile device via USB, in order to deliver power.

Support for USB power delivery capabilities, including reporting the actual or estimated power draw of the entire USB device, based on its current configuration state as well as the anticipated or historical usage patterns of its virtual functions and the load drawn during access of its internal or external resources.

Support for throttling protocols to limit the power draw by dynamically reducing performance or capabilities of the virtual functions, in order to stay within the power limits provided by the host computer (or another USB hub above it, if connected as such).

A USB Bridge Class device, which could manage power delivery and authentication to multiple virtualized downstream devices.

Implementation parameters (via "straps", fuses, jumpers, or other means) to reduce the number of available dynamic ports, in order to emulate USB hubs with fewer ports, or adjust the run-time usage of other internal logic constructs such as buffers or queues.

Logic parameters or definitions to reduce the number of implemented dynamic ports or the sizes of other internal logic constructs such as buffers or queues, in order to reduce the overall size of the logic implementation, customize an implementation for a particular use case, or restrict functionality to comply with power or thermal requirements.

Configuration parameters to instantiate the use of single or multiple Transaction Translator hub units, for the purpose of instantiating lower-speed virtual functions and bridging them to the higher-speed hub in various arrangements in order to maintain compatibility with various emulated devices on the dynamic ports.

Configuration or implementation parameters to select the USB bus speed of the virtual USB hub and whether or not it is a single-generation device (e.g. USB 2.0) supporting a single electrical protocol, or a multi-generation device (e.g. USB 3.x) which could support separate internal hub logic both for SuperSpeed (or its derivatives) and High/Full/Low Speed, as is the standard for USB 3.x-compliant hub devices.

Arbitration and Enforcement

The following features relating to arbitration and enforcement may be implemented in some embodiments:

Arbitration logic to share access to any internal or external resources across multiple virtual functions, for the purpose of prioritizing certain virtual ports, traffic classes, usage patterns or other types of packets based on desired criteria.

Arbitration or session-management logic to help coordinate shared access to a portion of an internal resource or an external bus/interface between a virtual function and a privileged "management function" (which may be part of the control function) without corrupting any internally stored data or externally-driven transactions.

Policy enforcement logic, to ensure that access policies for virtual functions (or the privileged "management function" or control function) are applied, depending on the mode of access or other active configuration parameters.

Logic to implement access controls relating to the provisioning and usage of virtual functions on downstream ports. This may include functions such as authentication, copy protection, unlocking and/or encryption. It may also work in conjunction with internal or external resources (if used) to coordinate or pass through any access control operations, according to the implementation of these resources.

Debug and Visibility

The following features relating to debug and visibility may be implemented in some embodiments:

Runtime logic such as "semaphores" to halt virtual ports when an internal error, bus error (for external resources) or operational error (for internal resources) would prevent continued nominal use of that resource in its current configured state, as abstracted by the virtual function. This may also include commands to resolve errors and bring the device and its resources (if any) back to their nominal operating state.

Run-control or debug commands to assist in the testing of a device's internal logic, by implementing features such as per-port halt/resume, parameters to affect the behavior of the control logic or any virtual functions, or a special interface to manage any stored internal configuration (if using a device-driven control model)

Monitoring logic to provide debug tracing of port activity, activity status (via indicator lights or an on-device display), or verbose output showing the device's internal behavior (via an in-band interface or some other dedicated channel) to provide additional visibility into the internal state of the device.

Internal logic to report the USB addresses and USB routing paths of connected virtual ports from the endpoint interface of the control function, to help software and drivers understand which control function and virtual functions were logically connected (i.e. implemented in the same USB device) for the purposes of correlation and richer device discovery.

Configuration, whether in-device or software-controlled, to reduce the speed or overall performance of virtual ports to induce various test conditions or assist with traffic management (e.g. arbitration or quality-of-service).

Dynamic Detection

The following features relating to dynamic detection may be implemented in some embodiments:

Persistent data in the form of a non-volatile storage device, to store a particular configuration of instantiated virtual port/function state, and re-instantiate automatically when the device is reset, re-plugged or moved to a new host computer.

Internal resources (e.g. NAND flash, storage devices or other buffers) which may be partitioned or subdivided internally, and assigned in parts to virtual functions, as per parameters to the command interface in the control endpoint. This may employ arbiters or other logic to manage concurrent access to the internal resources from multiple functions. It may also be accessed or managed by a control function's endpoint interface, either as a virtualized subset or with a higher-level "master" access mode.

External interfaces, such as buses or other I/O capabilities which may be virtually partitioned or otherwise abstracted for access from virtual functions, as per parameters to the command interface in the control endpoint. This may employ internal state or other logic to expose externally-connected devices and abstract the encapsulation of bus or interface transactions and/or may employ arbiters or other logic to manage concurrent access to the external interfaces from multiple functions. Such external interfaces may also be accessed or managed by a control function's endpoint interface (see above).

Compliance and Verification

The following features relating to compliance and verification may be implemented in some embodiments:

Configuration or implementation parameters to instantiate one of several different types of virtual functions, which may adhere either to published USB Device Class specifications or implement any other any vendor-specific behavior, and would act as a virtual USB device of that particular class or implementation (as configured or hard-coded). This may also include logic to determine whether a particular virtual function has a standard Device Class or implements a multi-function or "composite" functionality, using its descriptors to properly report the various interfaces and endpoints that are accessible to the host computer according to their class, as determined at instantiation time.

A privileged management interface, either via the in-band connection (i.e. a special endpoint interface exposed via the control function on the fixed control port) or an out-of-band connection (i.e. a debug probing port).

Firmware update support, if applicable, for the device manufacturer to issue bug fixes or feature enhancements to the device via any supported method. This may also include a read-only interface (via the control function's endpoint interface) to query the version of firmware that is currently running, for visibility, and a configuration protocol to enter firmware-update mode according to the device manufacturer's protocol or a standard USB firmware update specification.

Enhanced Virtualization

The following features relating to enhanced virtualization may be implemented in some embodiments:

Logic to implement a "nested" or "multi-level" hub architecture, to further expand the number of virtual ports, using additional levels of emulated hub logic. This may be subject to overall system limitations on the USB bus. This may also employ lower-level virtual USB hubs to be instantiated dynamically or statically. This may be used to smartly detect how many levels of hubs are supported by the system, or may be configured to operate in single-level or multi-level mode as desired.

Logic to support use of the virtual hub in an isolated software domain or a virtual machine manager ("hypervisor") environment on the host PC. This may employ different levels of abstraction or segmentation, to ensure that a particular domain or virtual machine may only access the virtual functions to which it has been granted explicit access. Support for current or future virtualization standards may also be provided.

Example Use Cases

The following briefly describes some example use cases for which a virtual USB hub may be implemented:

A USB debug adapter which connects to an external interface (such as I3C, Ethernet or CAN) and provides a virtualized view of other "slave" or "remote" devices, one mapped to each virtual function; each function could have an endpoint interface accessible to the host computer, for which specific transactions could be targeted to the particular slave/remote device, at a specific port or identifier on the external bus.

A USB debug probe which exposes various system resources on a target system and emulates various standard USB device class functions, such as a USB keyboard (following the standard HID class) which could send keystrokes to the host computer for the purpose of emitting detailed, human-readable debug logs or trace data streams into any text editor on the host computer.

A USB-connected "PC Stick" device which contains its own CPU, storage and memory, and exposes various resources as configurable virtual ports for use by the host computer.

A USB debug device which creates a virtual map of the connected target system's disks to the host computer, or emulates a disk stored in target system RAM and exposes that disk as if it were a USB flash drive (for example) connected to the host computer.

A USB Ethernet controller which creates virtual ports for each active VPN or IPSec connection to a specific destination on the network, thus exposing a single virtual port to a virtual machine for isolation; it could also enable Quality-of-Service (QoS) traffic shaping and management across all its virtual ports, gather debug information at an aggregate level, or effectively limit per-port bandwidth or induce network errors if needed, to fully test an IPSec or VPN software stack for robustness.

A USB-connected Ethernet router or wireless access point which creates virtual ports to allow the host computer to manage multiple subnets, wireless networks or traffic classes.

A USB flash drive (following the standard Mass Storage class or any other similar class) which allows for the creation of virtual disk devices or partitions, each of which appears as its own virtual function and could be mapped to the host computer as their own disk-like entities, possibly with device-level encryption enabled; the configuration of the virtual USB devices could also be persistently stored in USB flash itself, so that the user wouldn't need to re-provision disks after disconnecting and reconnecting the physical device (or rebooting the system, or moving it to a different PC). The USB flash drive may also emulate USB storage devices such as media card readers, optical drives or floppy disk drives, in order to provide compatibility with host software requiring the same.

A USB video display device (e.g. OLED monitor) which contains a physical display and instantiates multiple virtual monitors, thus appearing to the host computer as a flexible multi-monitor setup, for the purpose of testing the multi-display capabilities of an operating system and its user applications (e.g. Microsoft's PowerPoint display view versus presenter view) in a validation scenario, without requiring multiple physical monitors; each virtual monitor's geometry, scaling factor and on-screen location on the physical display could be customized by a software driver and/or physical controls on the display device itself.

A USB assistive technology device conforming to the HID (Human Interface Device) specification, with input and output interfaces that could be configured and virtualized to provide various methods of input for users with limited physical abilities or other restrictions on motor control, which prevents them from using typical USB input devices; the virtualization capabilities would be used to instantiate various control methods that could be customized to their unique needs and still provide software compatibility with a host computer.

A USB cryptographic accelerator, where each virtual function could be configured to expose a different algorithm to the host computer via its virtualized endpoint interface, for use by software that submitted requests to a cluster of co-processors inside the device to perform encryption, authentication or other advanced tasks such as cryptocurrency mining.

A USB protocol analyzer or device compliance tester, for use during a "bring-up" or "plug-fest" activity to emulate other downstream devices or induce certain conditions or restrictions when developing or testing new USB hosts or devices; such a device could include support for scripted actions, in order to generate and execute repeatable tests as part of an automated testing framework Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic or a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, programmable logic (e.g., FPGAs) etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B and C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising a Universal Serial Bus (USB) virtual hub, including:
   a USB upstream port;
   at least one external bus or external interface;
   wherein the apparatus is configured to,
      detect one or more devices connected to the at least one external bus or external interface or embedded in or attached to a computing device or computing system connected to at least one external device or external interface, at least one of the one of more devices comprising a non-USB device, wherein each non-USB device is configured to perform one or more functions;
      generate virtual USB configuration information corresponding to at least one of the one or more non-USB devices and the one or more functions configured to be performed by the one of the one or more non-USB devices; and
      present the virtual USB configuration information to a host when the host is connected to the USB upstream port via a USB link,
   wherein the virtual USB configuration information enables software running on the host to access at least one of,
      the one or more non-USB devices; and
      the one or more functions configured to be performed by the one or more non-USB devices,
   using communications employing a USB protocol sent between the host and the apparatus over the USB link.

2. The apparatus of claim 1, further comprising a control function connected to a downstream virtual port, wherein the control function includes an interface for controlling virtual ports in the virtual USB hub, and wherein the virtual USB configuration information further includes configuration information corresponding to the control function.

3. The apparatus of claim 1, wherein the apparatus is configured to:
   generate, for each non-USB device, virtual USB configuration information including,
   a) a virtual USB device connected to a downstream virtual port in the virtual USB hub;
   b) a virtual USB device connected to a downstream virtual port in the virtual USB hub and one or more virtual functions corresponding to the one of more functions that non-USB device is configured to perform; or
   c) for each of the one or more functions that non-USB device is configured to perform, a virtual USB device or virtual USB function connected to a downstream virtual port in the virtual USB hub; and
   present USB configuration information including the virtual USB configuration information to the host.

4. The apparatus of claim 1, wherein at least one of the one or more non-USB devices is a I3C target device or includes an I3C target device.

5. The apparatus of claim 4, further comprising:
   an I3C controller; and
   an I3C client, configured to operate as a bridge between USB and I3C protocols.

6. The apparatus of claim 4, wherein the I3C target device is connected to an external interface on the apparatus comprising an I3C bus.

7. The apparatus of claim 4, wherein the at least one external bus or external interface includes an external USB Type-C interface, wherein the I3C target device is included in the computing device including the I3C target device, and wherein SBU1 and SBU2 pins in the USB Type-C interface are used to implement an I3C bus over which signals are transmitted to facilitate communication between the apparatus and the I3C target device.

8. The apparatus of claim 7, wherein the computing device includes an embedded USB device or USB function, and the USB Type-C interface is used to enable the apparatus to communicate with the embedded USB device or USB function.

9. The apparatus of claim 1, wherein the at least one external bus or external interface includes an external USB interface, and wherein the apparatus is further configured to:
   detect a USB device connected to the external USB interface or a USB function embedded in a second apparatus connected to the external USB interface;
   generate USB configuration information corresponding to the USB device or embedded USB function; and
   present the USB configuration information to the host over the USB link,
   wherein the USB configuration information enables software running on the host to access the USB device or the embedded USB function using a USB protocol.

10. The apparatus of claim 1, further configured to:
    implement a virtual function corresponding to a physical USB device or USB function;
    present virtual USB configuration corresponding to the virtual function to the host; and
    facilitate communication using a USB protocol between the virtual function and software running on the host.

11. A method comprising
    implementing a virtual USB hub having an upstream USB port and at least one external bus or external interface; and
    enabling software running on a host connected to the upstream USB port via a USB link to communicate with at least one of,
       a first non-USB device connected to an external bus or external interface on the virtual USB hub;
       a first non-USB device embedded in a computing device connected to an external bus or external interface on the virtual USB hub; and
       one or more functions implemented by the first non-USB device connected to the external bus or external interface or implemented by the first non-USB device embedded in the computing device,
    wherein the virtual USB hub includes a control function connected to a downstream virtual port, and wherein the virtual USB configuration information further includes configuration information corresponding to the control function.

12. The method of claim 11, further comprising;
detecting the first non-USB device is connected to an external bus or external interface or the computing device having the first non-USB device embedded therein is connected to an external bus or external interface;
generating virtual USB configuration information corresponding to at least one of the first non-USB device and the one or more functions configured to be performed by the first non-USB device; and
presenting the virtual USB configuration information to the host,
wherein the virtual USB configuration information is configured to enable software running on the host to communicate with at least one of the first non-USB device and the one or more functions configured to be performed by the first non-USB device using data transmissions sent over the USB link using a USB protocol.

13. The method of claim 12, further comprising:
generating virtual USB configuration information corresponding to the first non-USB device, including,
 a) a virtual USB device connected to a downstream virtual port in the virtual USB hub;
 b) a virtual USB device connected to a downstream virtual port in the virtual USB hub and one or more virtual functions corresponding to the one of more functions that non-USB device is configured to perform; or
 c) for each of the one or more functions the non-USB device is configured to perform, a virtual USB device or virtual USB function connected to a downstream virtual port in the virtual USB hub.

14. The method of claim 11, further comprising:
detecting one of,
 a second non-USB device has been connected to the external bus or external interface of the virtual USB hub,
 a second non-USB device embedded within the computing device has been activated; and
 a second non-USB device has been attached to the computing device,
wherein the second non-USB device is configured to perform one or more functions;
generating updated virtual USB configuration information corresponding to at least one of the second non-USB device and the one or more functions configured to be performed by the second non-USB device; and
presenting the updated virtual USB configuration information to the host,
wherein the updated virtual USB configuration information is configured to enable the software running on the host to communicate with at least one of the second non-USB device and the one or more functions configured to be performed by the second non-USB device using data transmissions sent over the USB link using the USB protocol.

15. The method of claim 14, further comprising:
generating virtual USB configuration information corresponding to the second non-USB device, including,
 a) a virtual USB device connected to a downstream virtual port in the virtual USB hub;
 b) a virtual USB device connected to a downstream virtual port in the virtual USB hub and one or more virtual functions corresponding to the one of more functions that non-USB device is configured to perform; or
 c) for each of the one or more functions the non-USB device is configured to perform, a virtual USB device or virtual USB function connected to a downstream virtual port in the virtual USB hub.

16. The method of claim 11, wherein the virtual USB hub is implemented in an I3C probe apparatus including an I3C controller and the non-USB device comprises an I3C target device, further comprising implementing a USB-to-I3C bridge to enable the host to communicate with the I3C controller using the USB protocol.

17. The method of claim 16, where the at one external bus or external interface comprises a USB Type-C interface and wherein the I3C target device is embedded in a computing device connected to the I3C probe apparatus via a USB Type-C cable connected to the USB Type-C interface, and wherein SBU1 and SBU2 pins in the USB Type-C interface are used to implement an I3C bus over which signals are transmitted to facilitate communication between the I3C probe apparatus and the I3C target device.

18. The method of claim 17, wherein the computing device includes an embedded USB device or USB function, and the USB Type-C interface is used to enable software running on the host system to communicate with the embedded USB device or USB function using a USB protocol.

19. A system comprising:
 a host computer, having a Universal Serial Bus (USB) interface and including an operating system on which software is run; and
 an apparatus having a virtual USB hub, and including,
  a USB upstream port connected to the USB interface on the computer host via a USB cable, forming a USB link;
  at least one external bus or external interface; and
  a first downstream virtual port to which a control function is connected, the control function including an interface for controlling virtual ports in the virtual USB hub;
 wherein apparatus is configured to,
  detect one or more devices connected to the at least one external bus or external interface, at least one of the one of more devices comprising a non-USB device, wherein each non-USB device is configured to perform one or more functions;
  generate virtual USB configuration information corresponding to at least one of the one or more non-USB devices and the one or more functions configured to be performed by the one of the one or more non-USB devices; and
  present the virtual USB configuration information to the host computer,
 and wherein the virtual USB configuration information is used by the host computer to enable software running on the host computer to access at least one of,
  the one or more non-USB devices; and
  the one or more functions configured to be performed by the one or more non-USB devices,
 using USB communications sent between the host computer and the apparatus over the USB link and using a USB protocol.

20. The system of claim 19, wherein the apparatus includes an I3C controller and at least one non-USB device comprises an I3C target either coupled to an external bus or external interface on the apparatus or embedded in a computing device coupled to an external bus or external interface on the apparatus, and wherein the apparatus is configured to implement a USB-to-I3C bridge to facilitate communication between the host computer and the I3C controller.

21. The system of claim 20, wherein the at least one external bus or external interface includes a I3C bus, and wherein one or more I3C targets are embedded in a computing device coupled to the apparatus via the I3C bus.

22. The system of claim 20, wherein the at least one external bus or external interface includes an external USB Type-C interface, wherein one or more I3C targets are embedded in a computing device coupled to the apparatus via a USB Type-C cable coupled to the external USB Type-C interface, and wherein SBU1 and SBU2 pins in the USB Type-C interface are used to implement an I3C bus over which signals are transmitted to facilitate communication between the apparatus and the one or more I3C targets.

23. The system of claim 22, wherein the computing device includes an embedded USB device or USB function, and the USB Type-C interface is used to enable the apparatus to communicate with the embedded USB device or USB function.

24. The system of claim 19, wherein the at least one external bus or external interface includes an external USB interface, and wherein the apparatus is further configured to:
    detect a USB device connected to the external USB interface or a USB function embedded in a second apparatus connected to the external USB interface;
    generate USB configuration information corresponding to the USB device or embedded USB function; and
    present the USB configuration information to the host over the USB link,
    and wherein the USB configuration information is used by the host computer to enable software running on the host computer to access the USB device or the embedded USB function using a USB protocol.

\* \* \* \* \*